United States Patent
Bronson et al.

(10) Patent No.: US 10,817,592 B1
(45) Date of Patent: Oct. 27, 2020

(54) CONTENT TRACKING SYSTEM THAT DYNAMICALLY TRACKS AND IDENTIFIES PIRATED CONTENT EXCHANGED OVER A NETWORK

(71) Applicants: Glenn Joseph Bronson, Chelmsford, MA (US); Eirik Scott Skau Somerville, Wellesley, MA (US)

(72) Inventors: Glenn Joseph Bronson, Chelmsford, MA (US); Eirik Scott Skau Somerville, Wellesley, MA (US)

( * ) Notice: Subject to any disclaimer, the term of this patent is extended or adjusted under 35 U.S.C. 154(b) by 191 days.

(21) Appl. No.: 15/989,174

(22) Filed: May 24, 2018

Related U.S. Application Data

(60) Provisional application No. 62/510,270, filed on May 24, 2017.

(51) Int. Cl.
| | | |
|---|---|---|
| *G06F 21/16* | (2013.01) | |
| *G06F 21/10* | (2013.01) | |
| *H04L 29/06* | (2006.01) | |
| *H04L 29/08* | (2006.01) | |
| *H04L 29/12* | (2006.01) | |

(52) U.S. Cl.
CPC ............ *G06F 21/16* (2013.01); *G06F 21/105* (2013.01); *H04L 63/0236* (2013.01); *H04L 63/101* (2013.01); *H04L 67/22* (2013.01); *G06F 2221/0737* (2013.01); *H04L 61/1511* (2013.01)

(58) Field of Classification Search
CPC ..... G06F 21/16; G06F 21/105; H04L 63/0236
See application file for complete search history.

(56) References Cited

U.S. PATENT DOCUMENTS

| | | | | |
|---|---|---|---|---|
| 7,565,327 B2* | 7/2009 | Schmelzer | .............. | G06F 21/10 705/67 |
| 8,738,906 B1* | 5/2014 | Sampath | .............. | H04N 21/643 713/166 |
| 9,838,419 B1* | 12/2017 | Fleyder | ................. | H04L 63/145 |
| 2001/0051996 A1* | 12/2001 | Cooper | .................. | G06Q 10/10 709/217 |
| 2002/0009079 A1* | 1/2002 | Jungck | .............. | H04L 29/12066 370/389 |
| 2008/0320596 A1* | 12/2008 | Wang | ...................... | G06F 21/10 726/26 |

(Continued)

*Primary Examiner* — Jason Chiang
(74) *Attorney, Agent, or Firm* — Adibi IP Group, PC; Amir V. Adibi; Andrew C. Palmer

(57) ABSTRACT

A system comprises a Content Tracking System (CTS) and Content Tracking Network Modules (CTNMs). The CTS and CTNMs identify, track, report and block piracy over a network. The CTS stores content distribution network information (CDNI) and copyright profile information. The CDNI includes blacklist sites and whitelist sites. A content generating entity generates digital content and registers the content with the CTS. The CTS generates copyright profile information, and forwards the CDNI and the copyright profile information to all of the CTNMs on the network. Each of the CNTMs monitors network traffic and detects whether a destination address of a packets matches one of the blacklist sites. If a match is detected, then the CTNM tracks all packets having the same source address as the matched packet, effectively monitoring a user. The CTNM forwards this information to the CTS to report piracy, identify new pirate sites, and to prevent further piracy.

22 Claims, 23 Drawing Sheets

(56) References Cited

U.S. PATENT DOCUMENTS

| | | | |
|---|---|---|---|
| 2010/0036759 A1* | 2/2010 | Ben-Yaacov | G06Q 20/10 |
| | | | 705/30 |
| 2010/0138543 A1* | 6/2010 | Loman | H04L 63/0245 |
| | | | 709/227 |
| 2013/0137451 A1* | 5/2013 | Meredith | H04L 63/0236 |
| | | | 455/456.1 |
| 2014/0068773 A1* | 3/2014 | Stitelman | H04L 63/10 |
| | | | 726/24 |
| 2015/0082431 A1* | 3/2015 | Davis | H04L 63/1425 |
| | | | 726/23 |
| 2015/0237055 A1* | 8/2015 | Canoy | H04L 63/0236 |
| | | | 726/1 |
| 2016/0260141 A1* | 9/2016 | Zhang | H04N 21/2541 |
| 2018/0191757 A1* | 7/2018 | Epstein | H04L 43/08 |

* cited by examiner

CONTENT CONSUMING ENTITY IDENTIFIES CONTENT GENERATED BY CONTENT PROVIDING ENTITY ACCESSIBLE OVER A NETWORK

CONTENT CONSUMING ENTITY OBTAINS CONTENT GENERATED BY CONTENT PROVIDING ENTITY THROUGH A BLACK-LIST SITE

COPYRIGHT PROFILER NETWORK MODULE

IP VERSION 4 PACKET

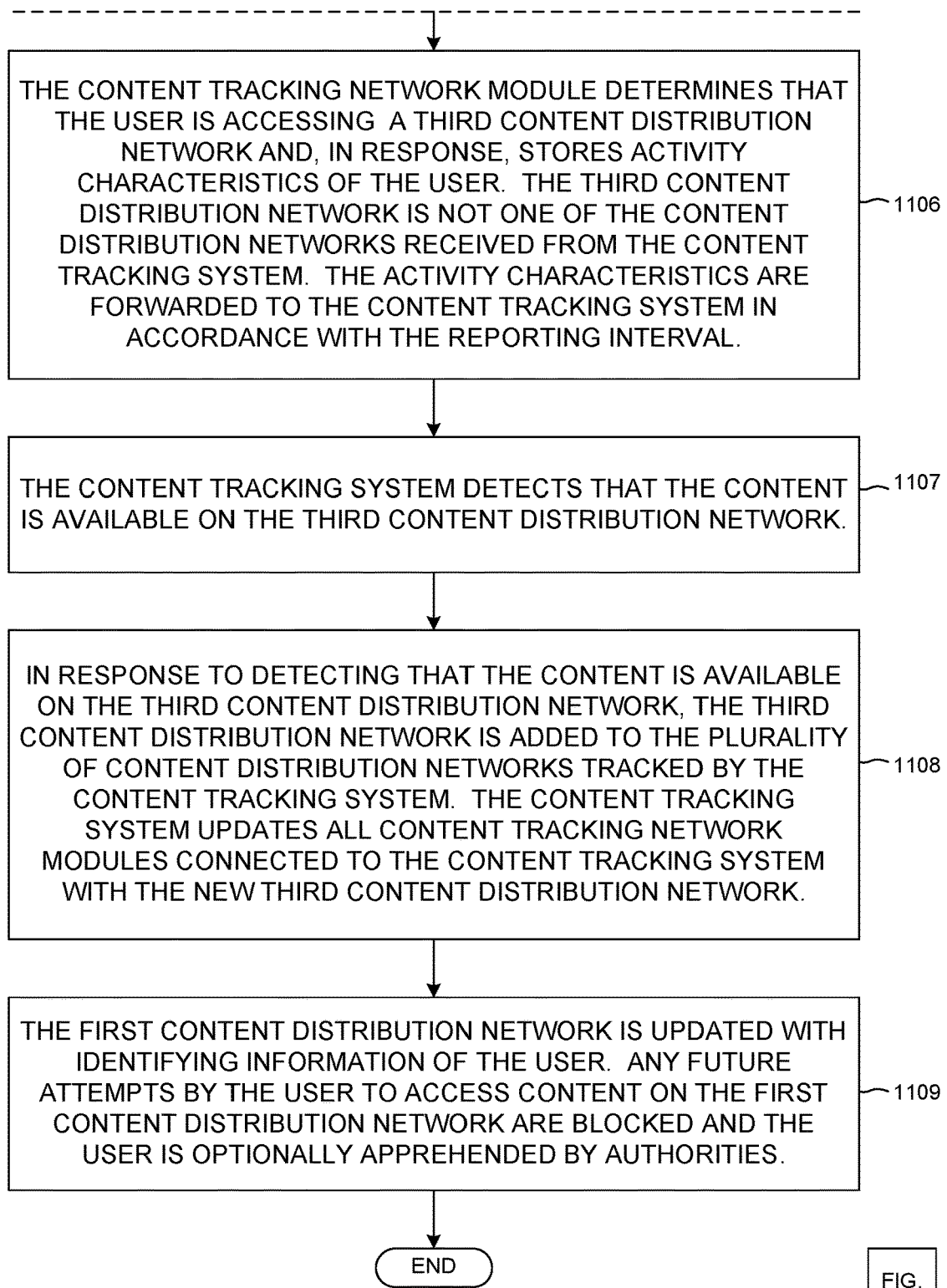

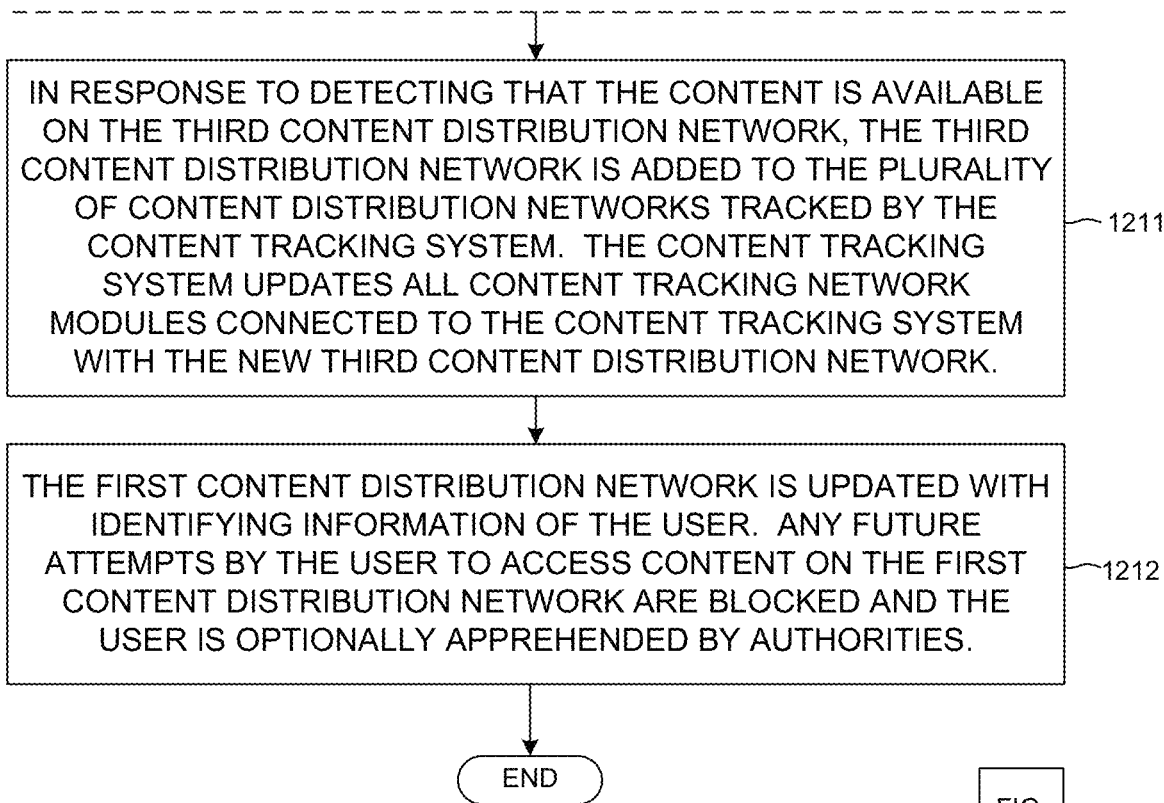

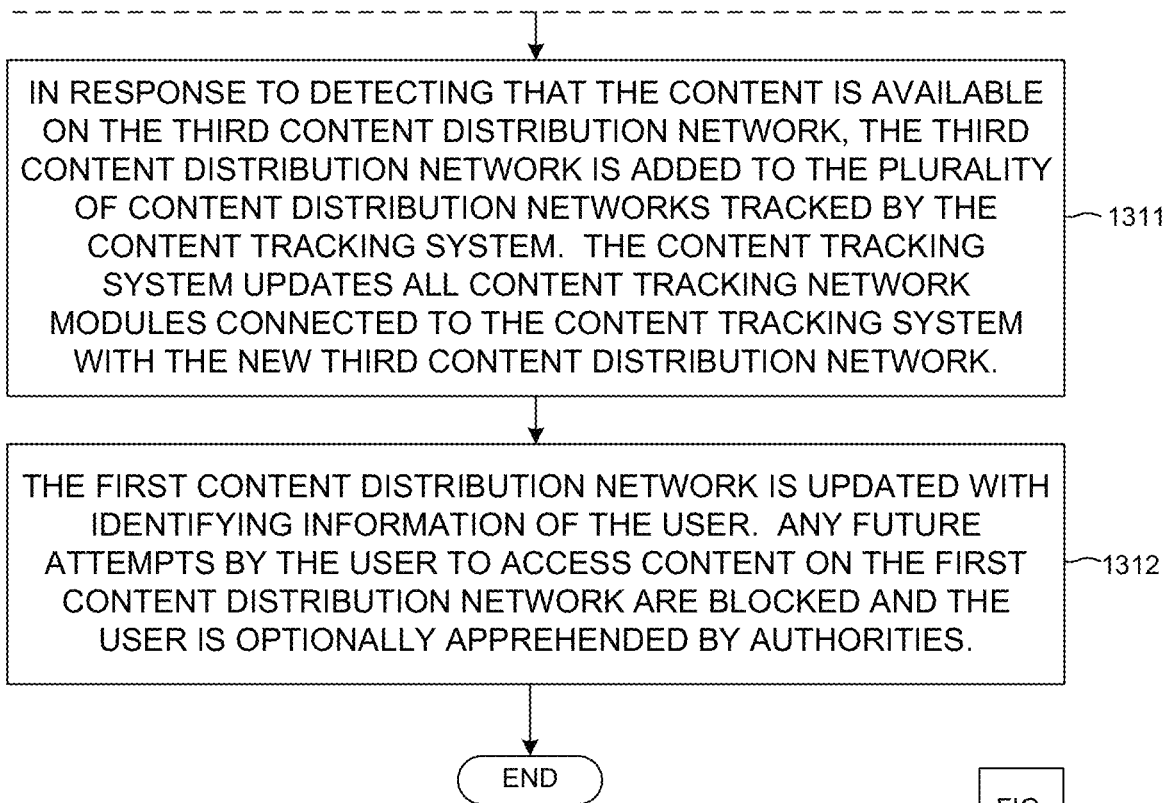

CONTENT TRACKING SYSTEM THAT DYNAMICALLY TRACKS AND IDENTIFIES PIRATED CONTENT EXCHANGED OVER A NETWORK

CROSS REFERENCE TO RELATED APPLICATIONS

This application claims the benefit under 35 U.S.C. § 119 from U.S. Provisional Patent Application Ser. No. 62/510,270, entitled "Packet Processing System, Method And Device For Detecting And Tracking Theft And Piracy Of Online Content," filed on May 24, 2017, the subject matter of which is incorporated herein by reference.

TECHNICAL FIELD

The described embodiments relate to network security, and more particularly to detecting piracy.

BACKGROUND INFORMATION

The availability of high network bandwidth and computers has allowed the widespread distribution of electronic multimedia and content. Although there have been many approaches and solutions to attempt to combat piracy of such content, most all fall short in their ability to do so reliably, quickly, cheaply, and easily. Known techniques involve searching for and validating copyrighted content on a per item basis. General purpose internet search engines including Google, Yahoo, and Bing, search and index sites based on generic requirements. There exists no real method of detecting and dealing with pirated content without time consuming human inspection and involvement.

Forensic and visual watermarking marking of the multimedia content at its point of origination may be used to assist in the process of tracking and preventing piracy, but are useless without locating both legal and illegal copies of copyrighted material on the vast expanse of the internet. Manual or automated use of conventional, online search engines such as (Google, Yahoo, and others) may or may not even locate copyrighted material since the pirated material may be on site not even be searchable or "indexed" by these search engines but require a custom crawler/search engine to carry out the task reliably. Maintaining a custom crawler specific for copyright violations is a complex and expensive undertaking. Present art may offer custom crawler functionality as either a self serve or paid subscription service, but it must be set up and maintained specifically for content: in this case one or more copyrights. Such a service many orders of magnitude more expensive than a simple internet search, and incurs time and overhead that cannot differentiate between legal and illegal copies. The resources required for any of these solutions are not economical and out of reach for most small entities that are copyright holders. Finally, even with marking and crawling technologies, manual examination is required in each step of the process of identifying, finding, and validating copyrighted material. A final step if required to take legal action for removal by filing a DMCA (digital millennial copyright act) claim makes the process even more costly. A more robust solution is desired.

SUMMARY

A system comprises a content tracking system and at least one content tracking network modules. The content tracking system and the content tracking network modules identify, track, report and block piracy over a network. The content tracking system stores content distribution network information and copyright profile information. The content distribution network information includes blacklist sites and whitelist sites. A content generating entity generates digital content and registers the content with the content tracking system. The content tracking system generates copyright profile information, and forwards the content distribution network information and the copyright profile information to all of the content tracking network modules on the network. Each of the content tracking network modules monitors network traffic and detects whether a destination address of a packets matches one of the blacklist sites. If a match is detected, then the content tracking network modules track all packets having the same source address as the matched packet, effectively monitoring a user. The content tracking network module forwards this information to the content tracking system to report piracy, identify new pirate sites, and to prevent further piracy.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 2 is a diagram that shows how the content consuming entity 10 identifies content distribution networks that store content that the content consuming entity 10 is searching for.

FIGS. 14A and 14B together form FIG. 14 which is a flowchart that illustrates a method 1100 in accordance with one novel aspect.

FIGS. 15A, 15B, and 15C together form FIG. 15 which is a flowchart that illustrates a method 1200 in accordance with one novel aspect.

FIGS. 16A, 16B, and 16C together form FIG. 16 which is a flowchart that illustrates a method 1300 of flow in accordance with one novel aspect.

DETAILED DESCRIPTION

Reference will now be made in detail to some embodiments of the invention, examples of which are illustrated in the accompanying drawings.

Figure 1:
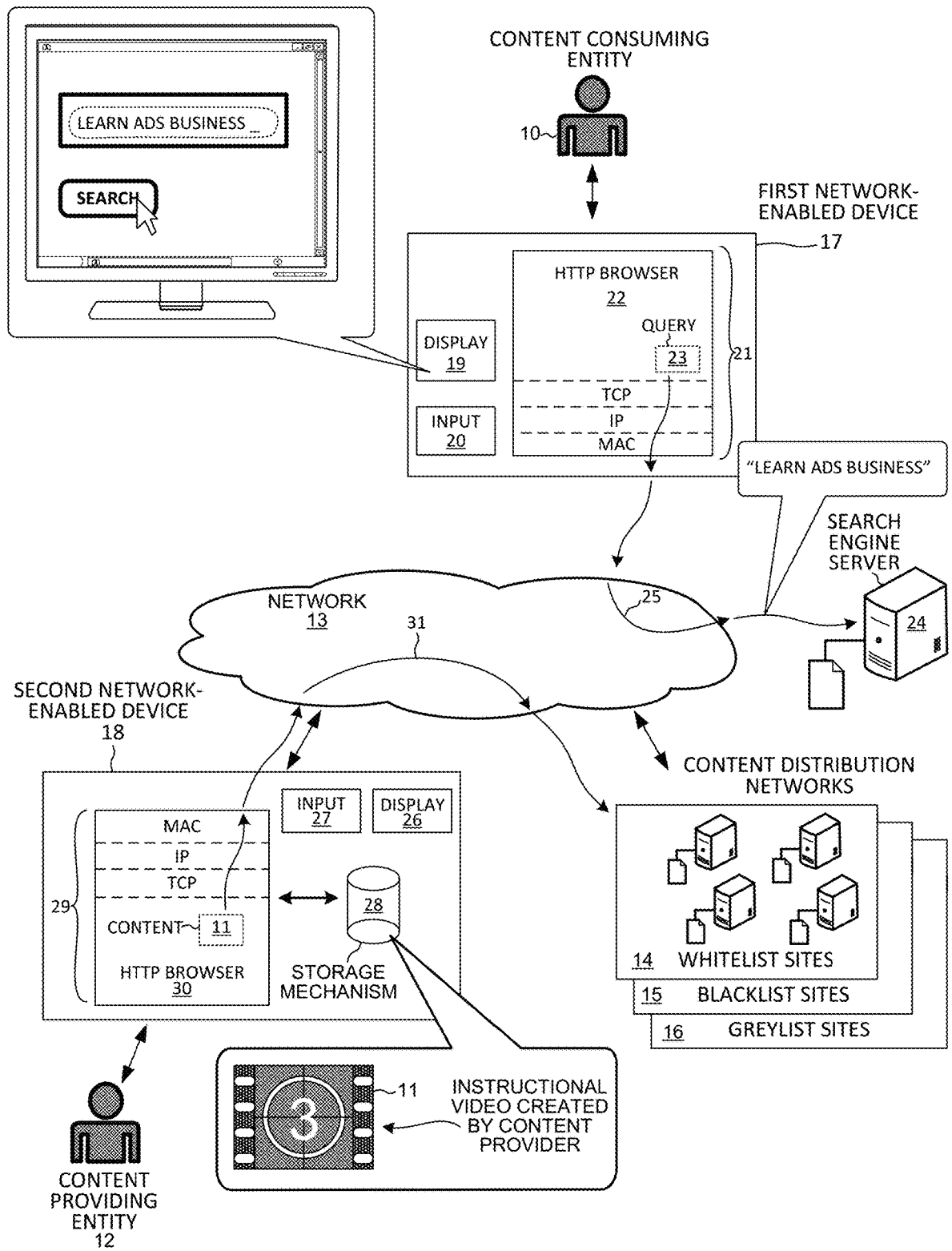
FIG. 1 is a high-level diagram that shows how a content consuming entity 10 obtains and consumes content 11 that is generated by a content providing entity 12 over a network 13.

FIG. 1 is a high-level diagram that shows how a content consuming entity 10 obtains and consumes content 11 that is generated by a content providing entity 12 over a network 13. The content providing entity generates content. In this example, the content generated by the content providing entity 12 is an amount of digital video 11. The amount of video 11 is an instructional video created by the content providing entity 12 that shows how to develop an Internet ads business. The instructional video 11 is sold by the content providing entity 12 over the network 13. The content 11 is stored in at least one content distribution network. Content distribution networks include whitelist sites 14, blacklist sites 15, and greylist sites 16. Content consuming entity 10 accesses the content 11 stored on at least one of the content distribution networks by operating a first network enabled device 17. Content providing entity 12 provides the content 11 onto the at least one content distribution networks by operating a second network enabled device 18.

Whitelist sites 14 provide a mechanism by which content providing entity 12 can sell content such as instructional video 11 and receive compensation for the content they generate. Whitelist sites 14 are content distribution networks that provide access to content that has been authorized by content providing entities, such as content providing entity 12. Whitelist sites 14 are preferred by content providing entities because they are able to monitor generated content and ensure compensation for the content that they generate. Whitelist sites 14 are also accessible to malicious users who wish to obtain content without having to pay money for the content. Such malicious users who obtain unauthorized or unlawful access to content and possibly further distribute the content are referred to as "piraters". As is explained in further detail below, at least one disclosed novel embodiment provides a mechanism to reduce the spread of pirated content and of pirates.

Black-list sites 15 provide a mechanism by which content can be accessed without having to pay for the content or can be accessed at a lower rate without compensating the content providing entities. Blacklist sites 15 are content distribution networks that provide access to content that has not been authorized by content providing entities, such as the content providing entity 12. Blacklist sites 15 are preferred by pirates and users who do not wish to pay for content because such malicious users are often able to obtain the content for free or at a substantially reduced rate. Black-list sites 15 are typically disliked by content providing entities because they risk losing revenue to blacklist sites that disseminate their content for free (or at a reduced amount). Blacklist sites are generally disliked by Internet Service Providers (ISP), telecommunication companies, and entities that operate network infrastructure because blacklist sites tend to breed malware, viruses and other malicious content that is damaging to computer networks. Greylist sites 16 are sites that may have pirated content.

The first network enabled device 17 includes a display 19 and an input mechanism 20. The first network enabled device executes a stack 21 of protocol processing layers including a MAC layer, an IP layer, a TCP layer, and an application layer. The application layer in this case includes an HTTP browser 22 application layer program. Content consuming entity 10 downloads the contents by first identifying a content distribution network on which desired content is stored. In one example, the content consuming entity 10 opens the browser application 22 and submits search terms in a search query 23 to a search engine server 24. In this example, the search terms of the query 23 are "learn ads business". Reference numeral 25 shows how the search query 23 is submitted to the search engine server 24.

The second network enabled device 18 includes a display 26, an input mechanism 27, and a storage mechanism 28. The second network enabled device 18 executes a stack 29 of protocol processing layers including a MAC layer, an IP layer, a TCP layer, and an application layer. The application layer in this case includes an HTTP browser 30 application layer program. The content providing entity 12 stores the amount of video content 11 in the storage mechanism. When the content providing entity 12 decides to make the amount of video content 11 publicly accessible, the content providing entity 12 uploads the content 11 to at least one white-list site through the browser application 30. The content providing entity 12 typically desires that the content 11 be made available for purchase on one of the white-list sites. Reference numeral 31 shows how the amount of video content 11 is uploaded onto at least one white-list site.

Figure 2:
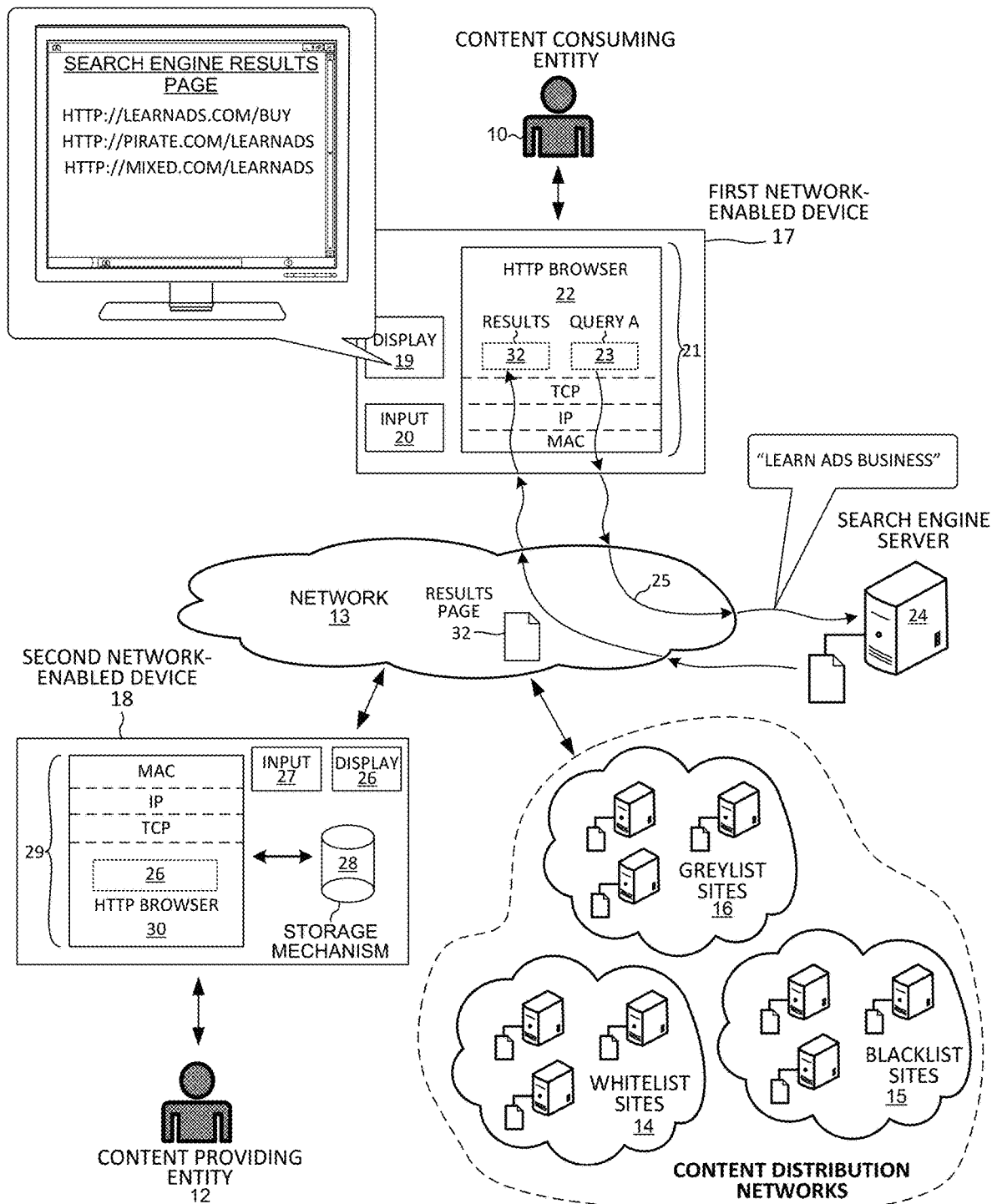

FIG. 2 is a diagram that shows how the content consuming entity 10 identifies content distribution networks that store content that the content consuming entity 10 is searching for. In response to the search query 23 submitted to the search engine server 24, the search engine server 24 responds by providing a search engine results page 32 to the first network-enable device 17. The HTTP browser 22 renders the search engine results page 32 on the display 19. The content consuming entity 10 reviews the search results presented on the display and is to select one of the content distribution sites from which the content consuming entity 10 desires to obtain the content. In this example, the content consuming entity 10 is presented with three Universal Resource Locators (URLs) that link ("http://learnads.com/buy", "http://pirate.com/learnads", and "http://mixed.com/learnads") to respective content distribution sites that might have content that corresponds with the search query 23. The URL "http://learnads.com/buy" corresponds to a web page on a whitelist site 14. The URL "http://pirate.com/learnads" corresponds to a web page on a blacklist site 15. The URL "http://mixed.com/learnads" corresponds to a web page on a greylist site 16. The particular URLs provided in this example and the search results are provided for instructional purposes only. Search results may include only whitelist sites, only blacklist sites, only greylist sites, or a combination of the above. In other example, the connections to the distribution networks are established through URLs obtained through other mechanisms than a search engine. For example, connections to the distribution networks may involve a peer-to-peer applications or search queries across multiple search sites. The example of FIG. 2 shows how the content consuming entity 10 often has a choice as to whether to obtain the content from one of the whitelist sites 14, one of the blacklist sites 15, or one of the greylist sites 16.

Figure 3:
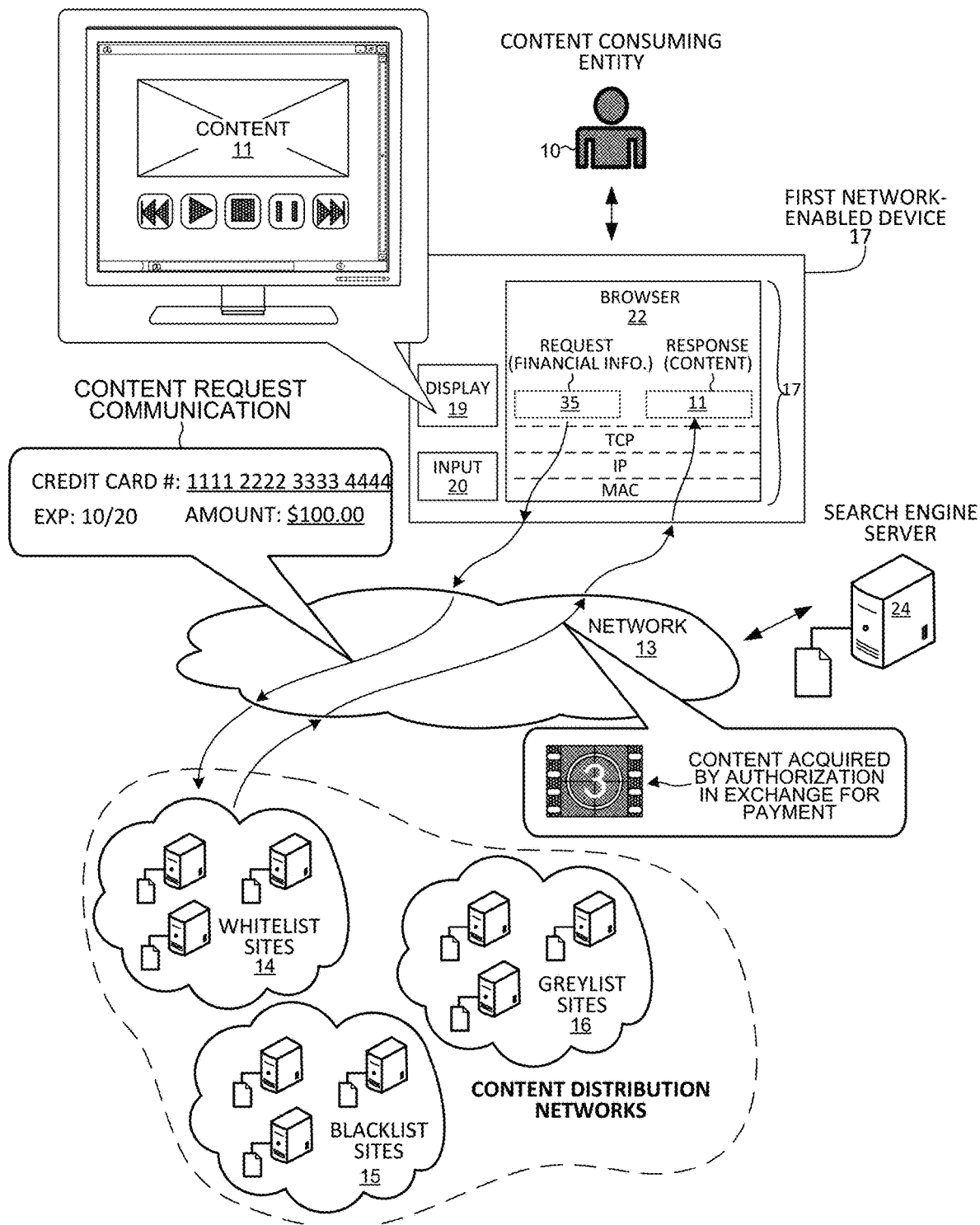
FIG. 3 is a diagram that shows how a content consuming entity 10 obtains content 11 generated by content providing entity 12 through a whitelist site.

FIG. 3 is a diagram that shows how a content consuming entity 10 obtains content 11 generated by content providing entity 12 through a whitelist site. In this example, the content consuming entity 10, after reviewing the search results of FIG. 2, chooses to obtain the content 11 through one of the whitelist sites 14. For example, the content consuming entity 10 clicks on the link "http://learnads.com/buy" and is taken to a web page (not shown) where the user can purchase the content 11. The content consuming entity 10 supplies financial information 35 onto the web page on one of the whitelist sites 14. In response, the whitelist site communicates the content 11 to the first network-enabled device 17. The content providing entity 12 typically receives a portion of the sale amount. In this example, the content 11 is an amount of video content 11 that the browser application 22 presents to the content consuming entity 10 via the display 19. The example of FIG. 3 shows an authorized purchase of content through a whitelist site 14. It is also possible to perform a similar transaction through one of the greylist sites 16.

Figure 4:
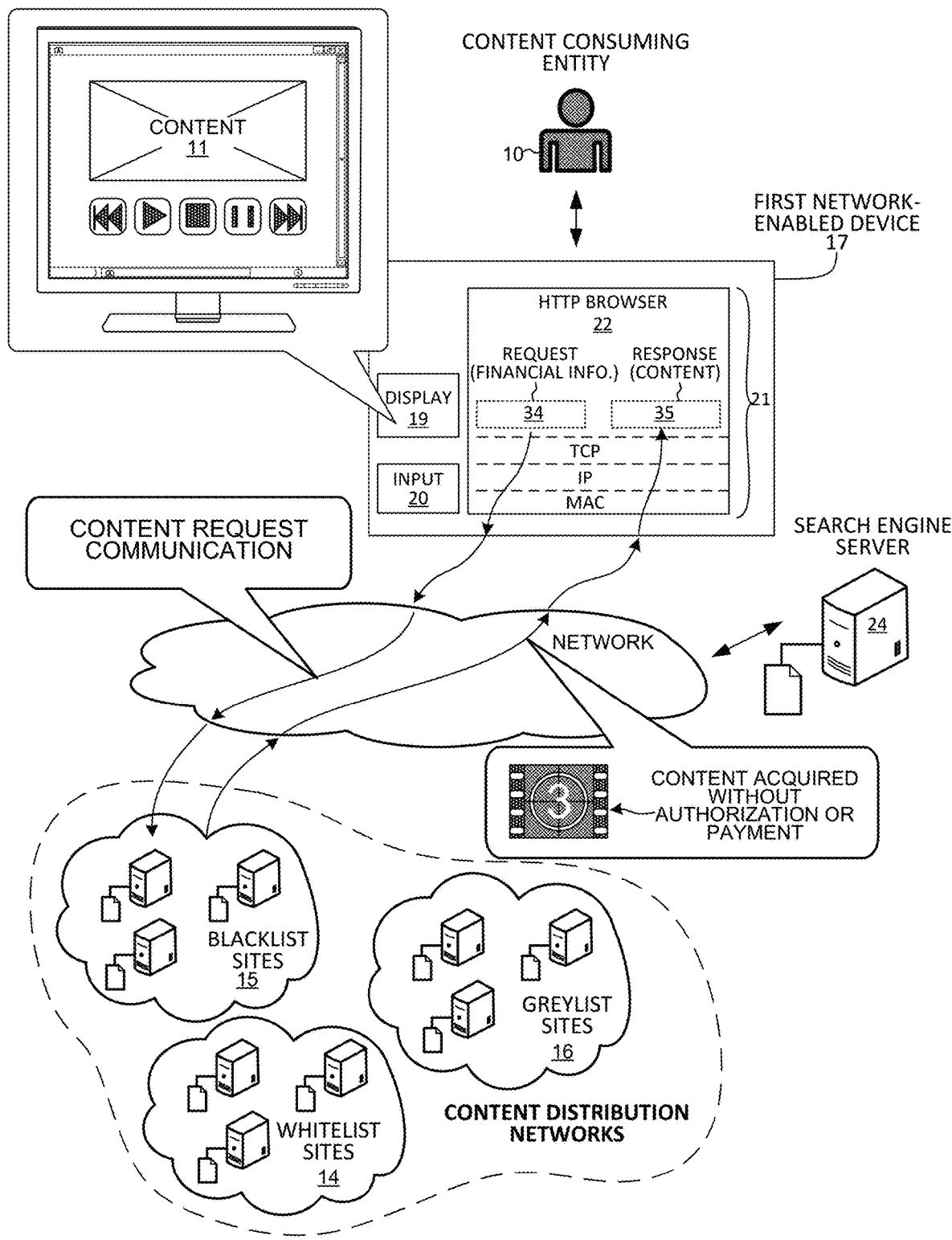
FIG. 4 is a diagram that shows how the content consuming entity 10 obtains content 11 generated by content providing entity 12 through a blacklist site.

FIG. 4 is a diagram that shows how the content consuming entity 10 obtains content 11 generated by content providing entity 12 through a blacklist site. In this example, the content consuming entity 10, after reviewing the search results of FIG. 2, chooses to obtain the content 11 through one of the blacklist sites 15. For example, the content consuming entity 10 clicks on the link "http://pirate.com/learnads" and is taken to a web page (not shown) where the user can obtain the content 11 without having to pay for the content. The content consuming entity 10 supplies no financial information and instead initiates a download (or transfer) request from one of the blacklist sites. The content 11 is supplied from one of the blacklist site sites onto the first network-enabled device 17. In this example, the content 11 is an amount of video content 11 that the browser application 22 presents to the content consuming entity 10 via the display 19. The example of FIG. 4 shows an unauthorized acquisition of content through a blacklist site 15. It is also possible to perform a similar transaction through one of the greylist sites 16. The content providing entity 12 receives no compensation. The first network-enabled device 17 is also susceptible to being exposed to malicious applications from accessing one of the blacklist sites.

Figure 5:
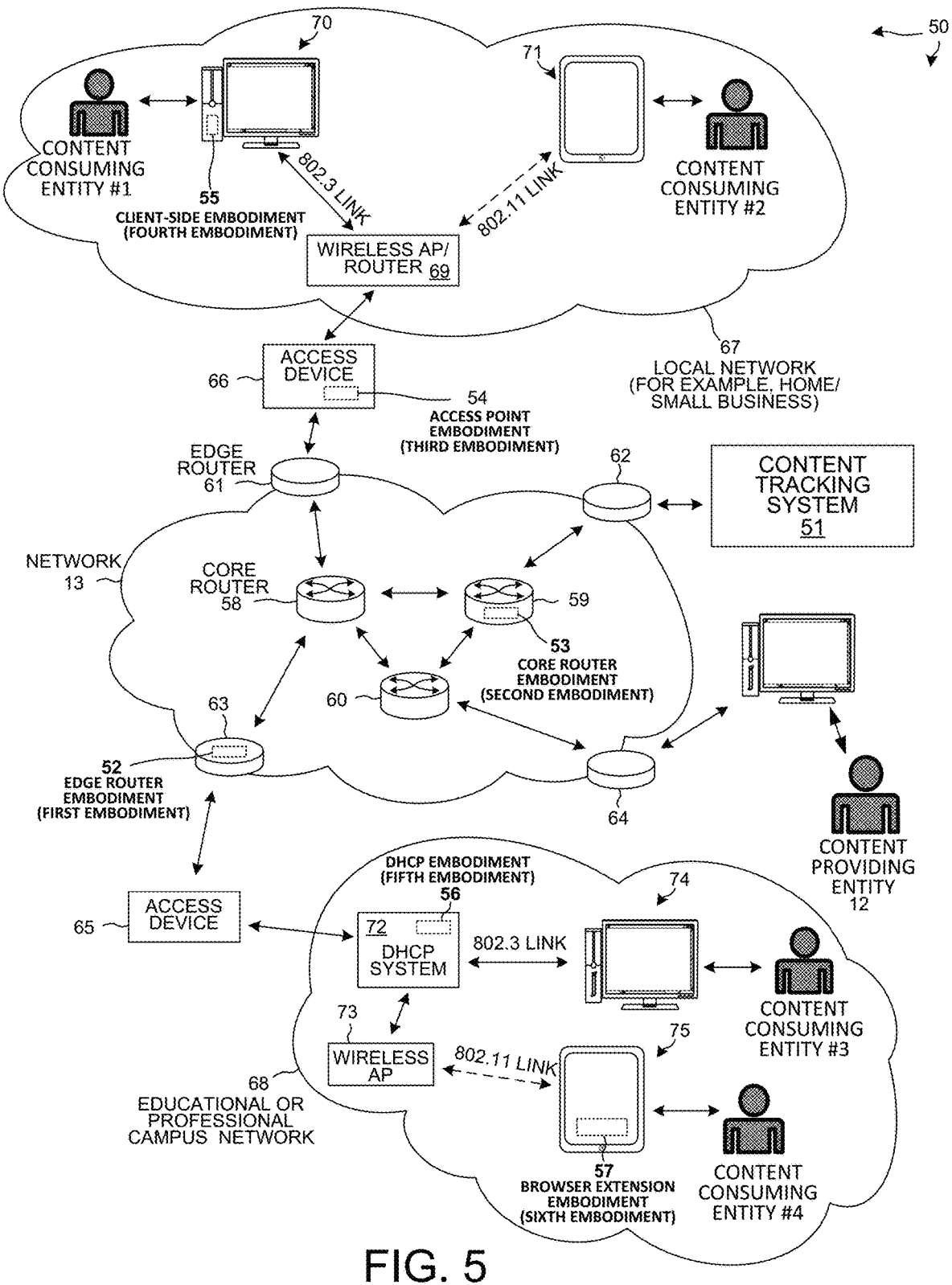
FIG. 5 is a diagram of a system 50 that shows how a novel content tracking system 51 operates with at least one of content tracking network modules 52-57 to reduce the likelihood of pirated content being distributed across the network 13.

FIG. 5 is a diagram of a system 50 that shows how a novel content tracking system 51 operates with at least one of content tracking network modules 52-57 to reduce the likelihood of pirated content being distributed across the network 13. The system 50 comprises content tracking system 51, core routers 58, 59, and 60, edge routers 61, 62, 63, and 64, access devices 65 and 66, a local network 67, and a campus network 68. The local network 67 comprises a dual-mode router and wireless access point 69, a network-accessible computer system 70, and a network-enabled portable electronic device 71. The computer system 70 connects to the dual-mode router and wireless access point 69 via an 802.3 wired link. The network-enabled portable electronic device 71 connects to the dual-mode router and wireless access point 69 via an 802.11 wireless link. The campus network 68 comprises a Dynamic Host Control Protocol (DHCP) system 72, a wireless access point 73, a computer system 74, and a network-enabled portable electronic device 75. The computer system 74 connects to the DHCP system 72 via an 802.3 wired link. The network-enabled portable electronic device 71 connects to the wireless access point 73 via an 802.11 wireless link and, in turn, connects to the DHCP system 72 via an 802.3 wired link. Each of content consuming entities #1, #2, #3, and #4 and represent different users that access content across network 13.

Each of the content tracking network modules 52-57 shown in FIG. 5 is a different embodiment of a content tracking network module that is configured to operate in a particular environment. In a first embodiment, a content tracking network module 52 operates on an edge router 52. In one example, the content tracking network module 52 is realized as an amount of dedicated hardware. In another example, the content tracking network module 52 is realized entirely in software without any discrete hardware. In yet another example, the content tracking network module 52 is implemented in a combination of dedicated hardware and software.

In a second embodiment, a content tracking network module 53 operates on a core router 59. In one example, the content tracking network module 53 is realized as an amount of dedicated hardware. In another example, the content tracking network module 53 is realized entirely in software without any discrete hardware. In yet another example, the content tracking network module 53 is implemented in a combination of dedicated hardware and software. Both the first embodiment involving the content tracking network module 52 and the second embodiment involving the content tracking network module 53 are deployed in an ISP environment.

In a third embodiment, a content tracking network module 54 operates on an access device 66. In one example, the content tracking network module 54 is realized as an amount of dedicated hardware. In another example, the content tracking network module 54 is realized entirely in software without any discrete hardware. In yet another example, the content tracking network module 54 is implemented in combination of dedicated hardware and software.

In a fourth embodiment, a content tracking network module 55 operates on the computer system 70. In one example, the content tracking network module 55 is an amount of dedicated hardware that is connected to the computer system 70. In another example, the content tracking network module 55 is a software application that runs on computer system 70 and has no discrete hardware. In yet another example, the content tracking network module 55 is implemented in a combination of dedicated hardware and software.

In a fifth embodiment, a content tracking network module 56 operates on a DHCP system 56 of the campus network 68. In one example, the content tracking network module 56 is realized as an amount of dedicated hardware. In another example, the content tracking network module 56 is realized entirely in software without any discrete hardware. In yet another example, the content tracking network module 56 is implemented in combination of dedicated hardware and software. The content tracking network module 56 is especially effective in combating piracy because the DHCP system 72 is often able to associate piracy with a specific Media Access Control (MAC) address.

In a sixth embodiment, a content tracking network module 57 is a browser application extension that operates on a client-side device. In the sixth embodiment, the content consuming entity #4 downloads the content tracking network module 57 and installs the module 57 as a browser extension. The content tracking network module 57 is configured to be deployed in campus network 68, local network 67, or other Internet accessible networks.

In accordance with one novel aspect, the content providing entity 12 generates content, such as digital video 11, and registers the content with the content tracking system 51. The content tracking system 51 stores copyright profile information that associates the content providing entity 12 with the content, and the copyright profile information also includes user identifying information (for example, name, contact, etc.) and content information (for example, protocol, type, keywords, etc.). The content tracking system 51 maintains content distribution network information. The content distribution network information includes whitelist sites, blacklist sites, and greylist sites.

The content tracking system 51 provides the copyright profile information and the content distribution network information to at least one of the content tracking network modules 52-57 over the network 13. Each of the content tracking network modules 52-57 monitors traffic to detect user access to sites in the content distribution network information maintained by the content tracking system 51. Each of the content tracking network modules 52-57 tracks and monitors activity characteristics of suspicious users and communicates these activity characteristics to the content tracking system 51. The content tracking system 51 in turn, uses the activity characteristics to notify content providing entities, to prevent pirate users from accessing additional content, and to update the content distribution network information to include newly identified blacklist and greylist sites.

Figure 6:
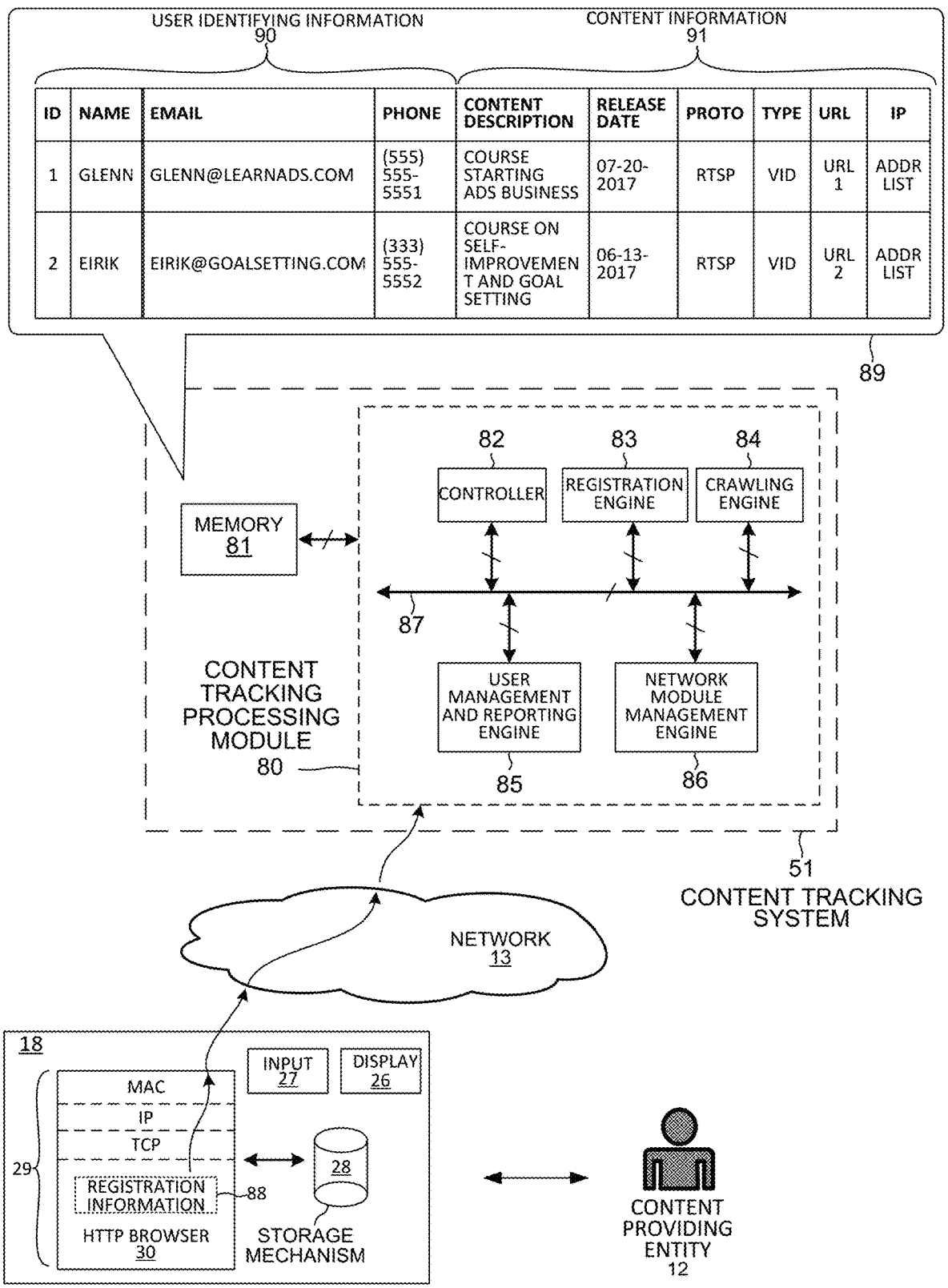
FIG. 6 illustrates how the content providing entity 12 registers content with content tracking system 51 to be monitored and tracked.

FIG. 6 illustrates how the content providing entity 12 registers content with content tracking system 51 to be monitored and tracked. The content tracking system 51 comprises a content tracking processing module 80 and a memory 81. The content tracking processing module 80 comprises a controller 82, a registration engine 83, a crawling engine 84, a user management and reporting engine 85, and a network module management engine 86, and a local bus 87. The controller 82 controls operation of the registration engine 83, the crawling engine 84, the user management and reporting engine 85, and the network module management engine 86 via the local bus 87. The registration engine 83 generates and stores copyright profile information. The crawling engine 84 uses activity characteristic information to identify new blacklist and greylist sites to add to the content distribution information that is maintained by the content tracking processing module 80. The user management and reporting engine 85 handles user management including adding new users, deleting users, updating user information, and forwarding potential piracy violations to users. The network module management engine 86 controls communication with any content tracking network modules configured to communicate with content tracking system 51. The network module management engine 86 forwards content distribution network information, such as whitelist sites, blacklist sites, and greylist sites to the various content tracking network modules, such as modules 52-57. The network module management engine 86 receives activity characteristics and user information that are recorded by the content tracking network modules.

To register content, the content providing entity 12 provides registration information 88 onto the content tracking system 51 via the network. The content has either already been released or is going to be released at a future date. Registration information 88 is received onto the content tracking system 51 and is processed by the registration engine 83. The registration engine 83 generates copyright profile information 89 that is stored in the memory 81. The copyright profile information 89 comprises user identifying information 90 and content information 91.

Figure 7:
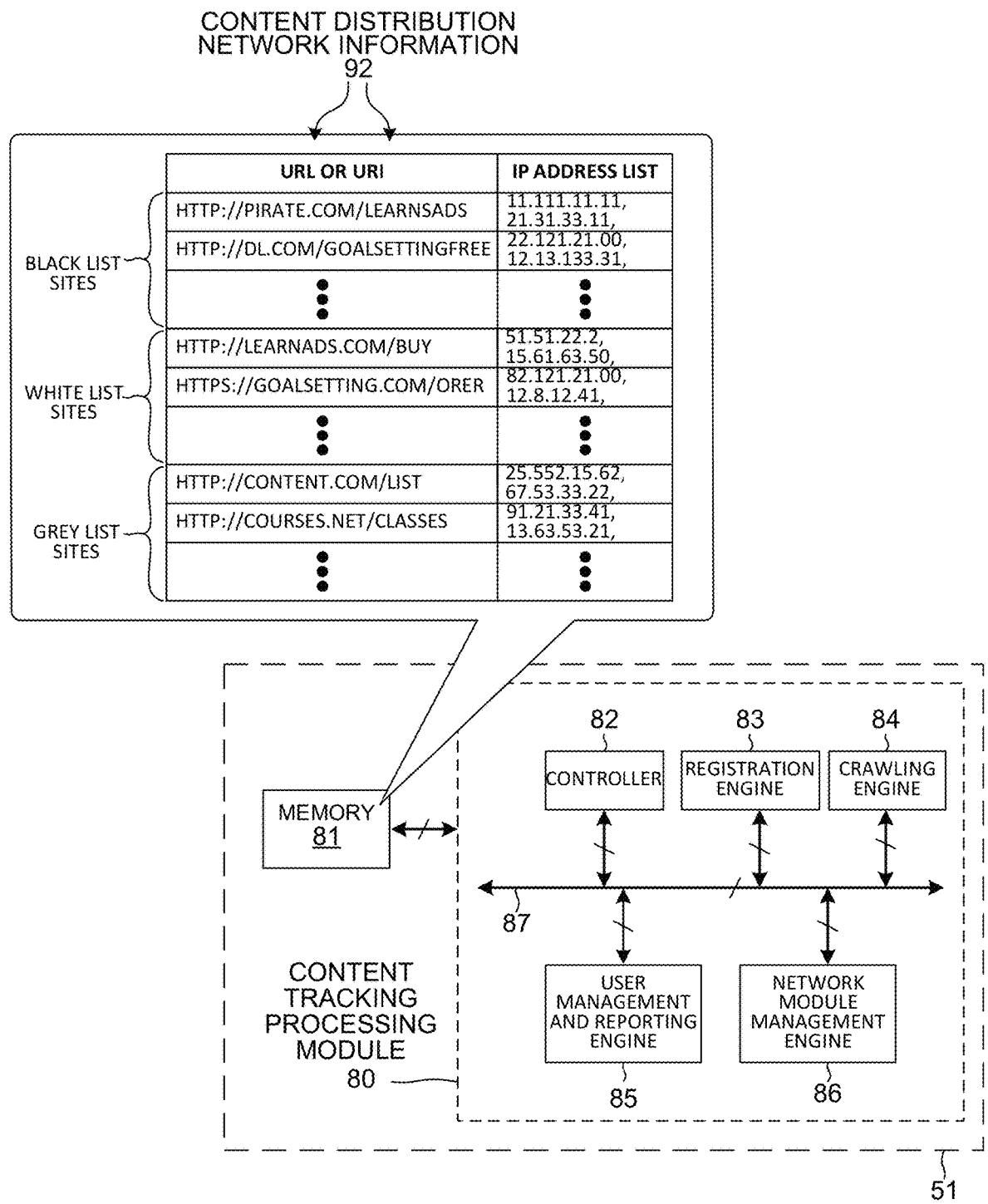
FIG. 7 is a diagram showing the content distribution network information 92 that is maintained by the content tracking system 51.

FIG. 7 is a diagram showing the content distribution network information 92 that is maintained by the content tracking system 51. The content distribution network information 92 includes a list of blacklist sites, whitelist sites, and greylist sites that are maintained by the content tracking system 51. The content tracking system 51 updates the blacklist sites using the activity characteristics provided by content tracking network modules, such as modules 52-57, and by using the crawling engine 84 to identify new blacklist sites. Each URL shown in the content distribution network information 92 has an associated list of IP addresses that are maintained, updated, and deleted. The content distribution network information 92 is forwarded to the content tracking network modules, such as modules 52-57.

Figure 8:
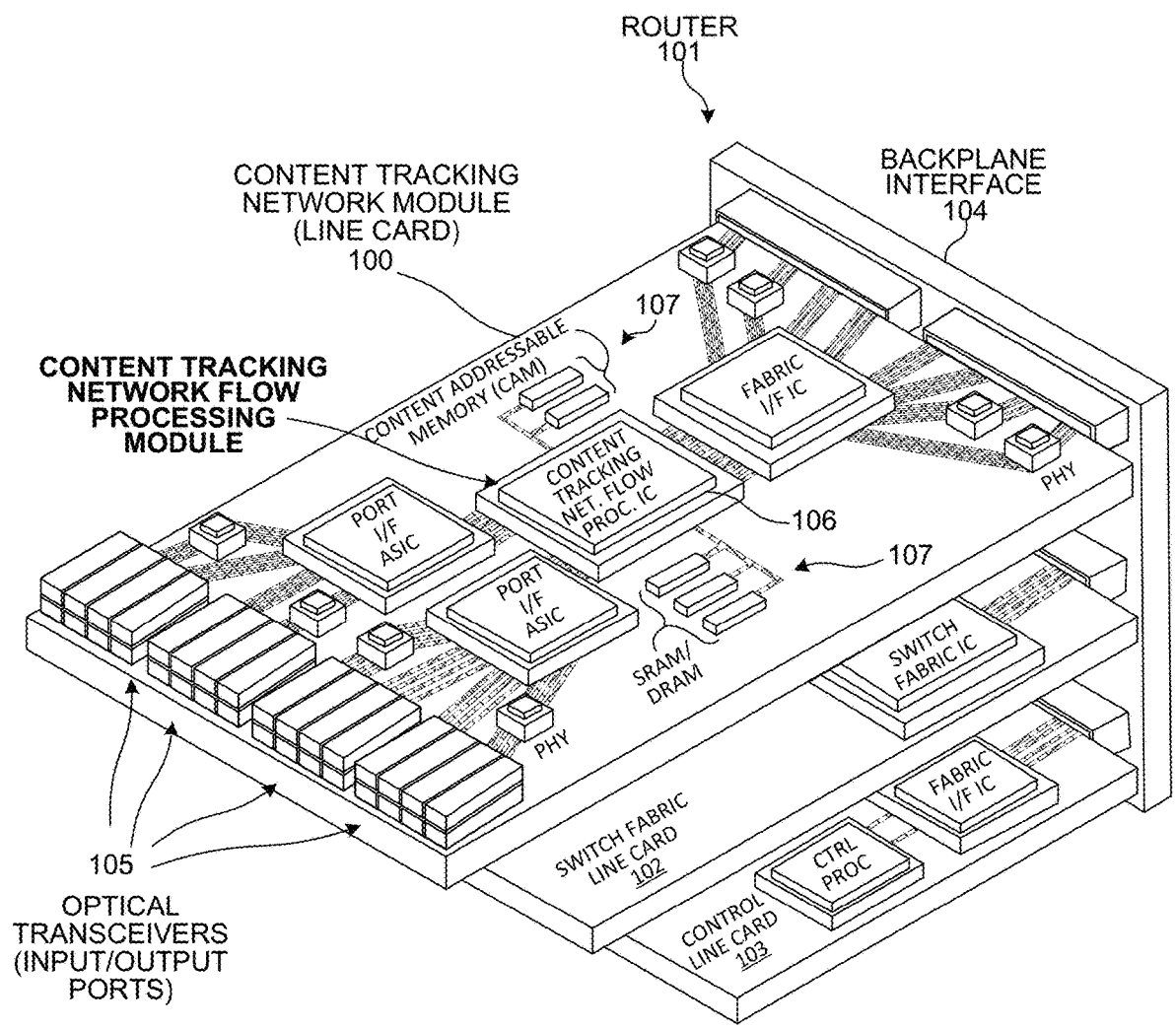
FIG. 8 is one embodiment of a content tracking network module 100.

FIG. 8 is one embodiment of a content tracking network module 100. The content tracking network module 100 is a line card that is part of a router 101. The coupled content tracking network module 100 is connected to a backplane interface. The router 101 also comprises a switch fabric line card 102 and a control line card 103. Optical transceiver modules 105 support ingress and egress traffic into and out of the content tracking network module 100. The content tracking network module 100 includes a network flow processing integrated circuit (IC) 106 and memory structures 107. The content tracking network flow processing IC 106 is mirrored on a network port and is used to monitor network traffic.

Figure 9:
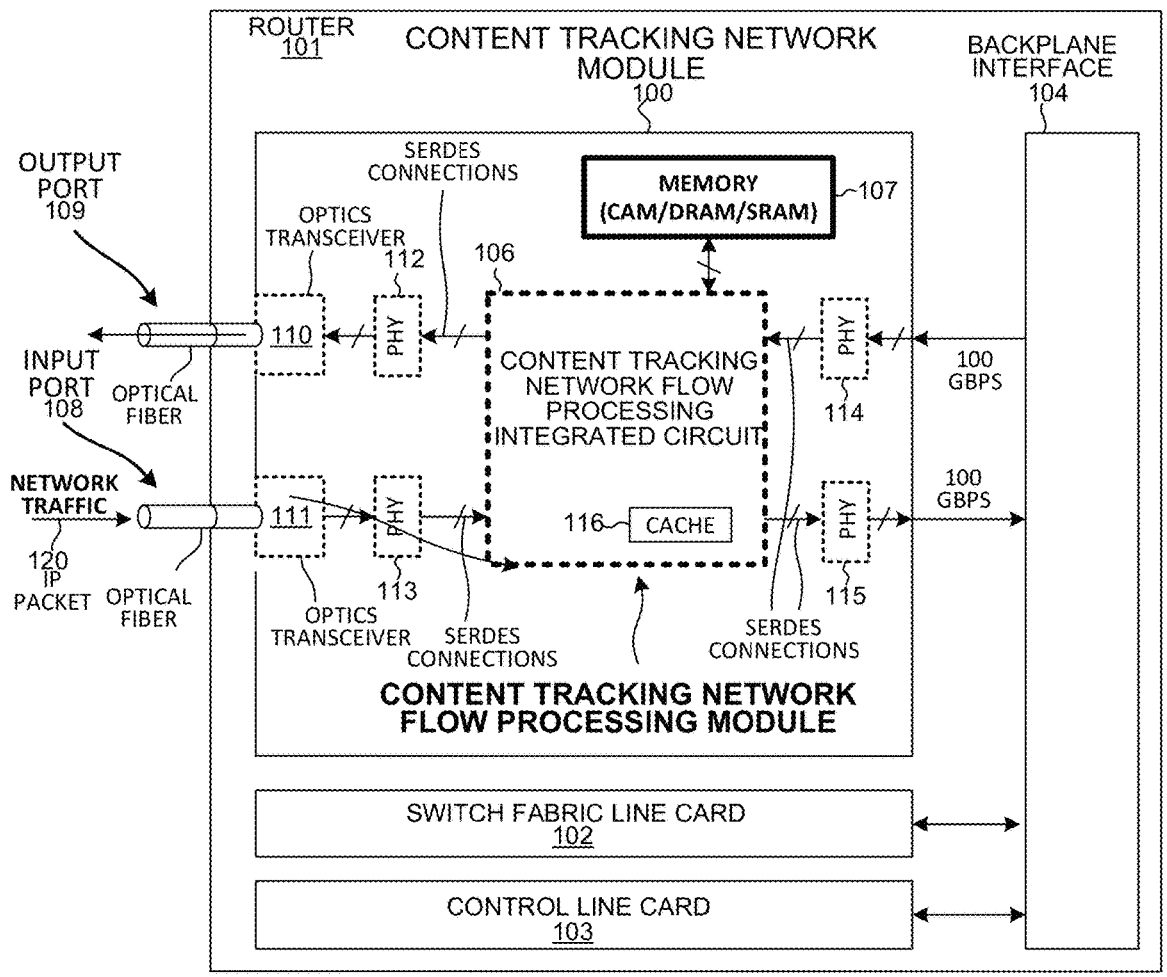
FIG. 9 is a block diagram of the content tracking network module 100.

FIG. 9 is a block diagram of the content tracking network module 100. The content tracking network module 100 includes input port 108, output port 109, optics transceivers 110 and 111, PHY circuit links 112-115, the content tracking network flow processing IC 106, and the memory 107. The content tracking network flow processing IC 106 includes a cache 116.

The content tracking network module 100 has many additional input and output ports, but only two are shown to simplify explanation. The network module 100 includes multiple high speed 10 Gbits ports. For the purposes of explanation, not all of the high speed packet interface ports 105 are shown. But the high speed packet interface ports 105 are connected to data bus 136. By default, these port interfaces are configured as input interfaces and are connected to port mirroring interfaces on a network switch or router. In this mode of operation the switch or routers directs all network traffic from one or more network segments: vlans or subnets, respectively, out their network mirror interfaces into the packet input ports 105. In this manner the copyright processor can examine large quantities of traffic from multiple network segments servicing many users. This default configuration ensures that the module and copyright processor is not a point of failure for the network, and truly passive: it can come turn on, come and go, and be reconfigured without effecting network performance or user experience. Multiple packet interfaces may also be configured by means of module configuration information 144 as pass through in which traffic passes in one 105 interface and out another 105 interface. In this case the packet manager 134 is configured to not only provide packets to all the engines, but forward traffic between the interfaces. This type of configuration, as opposed to the default input configuration, may be desired if the DHCP proxy/DHCP relay engine is enabled, sufficient port mirroring is available, filtering is required (the copyright processor is required to not grant DHCP for black list sites or filter traffic to such sites) or the network topology requires it. Unlike the default configuration it is not passive and may become a point of failure in this mode, however. In various embodiments there may be more than four packet input ports 105, but at least one high speed port is needed.

Figure 10:
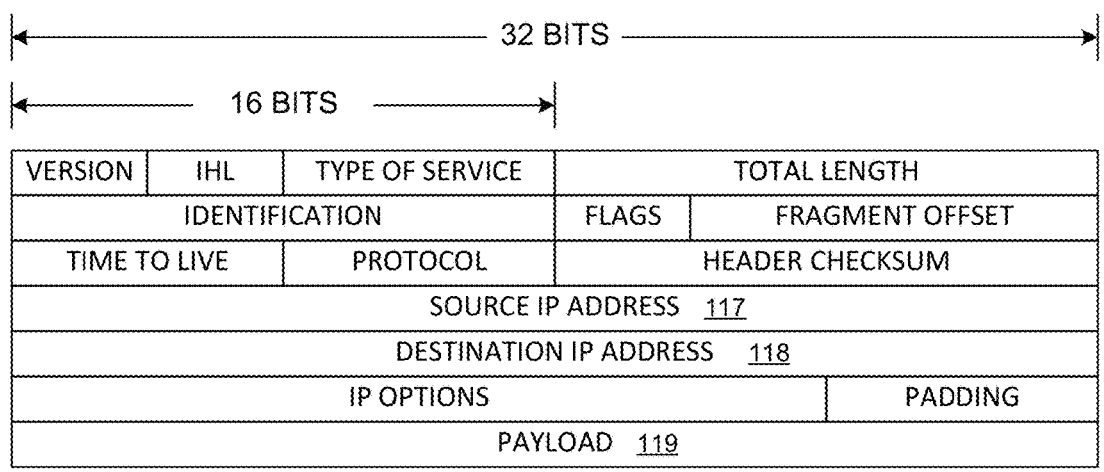
FIG. 10 is a diagram of a typical IP version 4 packet.

FIG. 10 is a diagram of a typical IP version 4 packet. The content tracking network module 100 is configured to monitor the source IP address 117 of an incoming packet 120 to track users that are suspected of being pirates. The content tracking network module 100 is configured to monitor the destination IP address 118 of an incoming packet to track users that are accessing whitelist sites, blacklist sites, or greylist sites of the content distribution network information provided by the content tracking system 51. Additionally, if the incoming packet is not HTTPS and is not encrypted, then the content tracking network module 100 is configured to identify potentially pirated content in the payload 119 of the incoming packet. In one example, this involves performing keyword searches on the payload 119 contents to identify keywords in the copyright profile.

Figure 11:
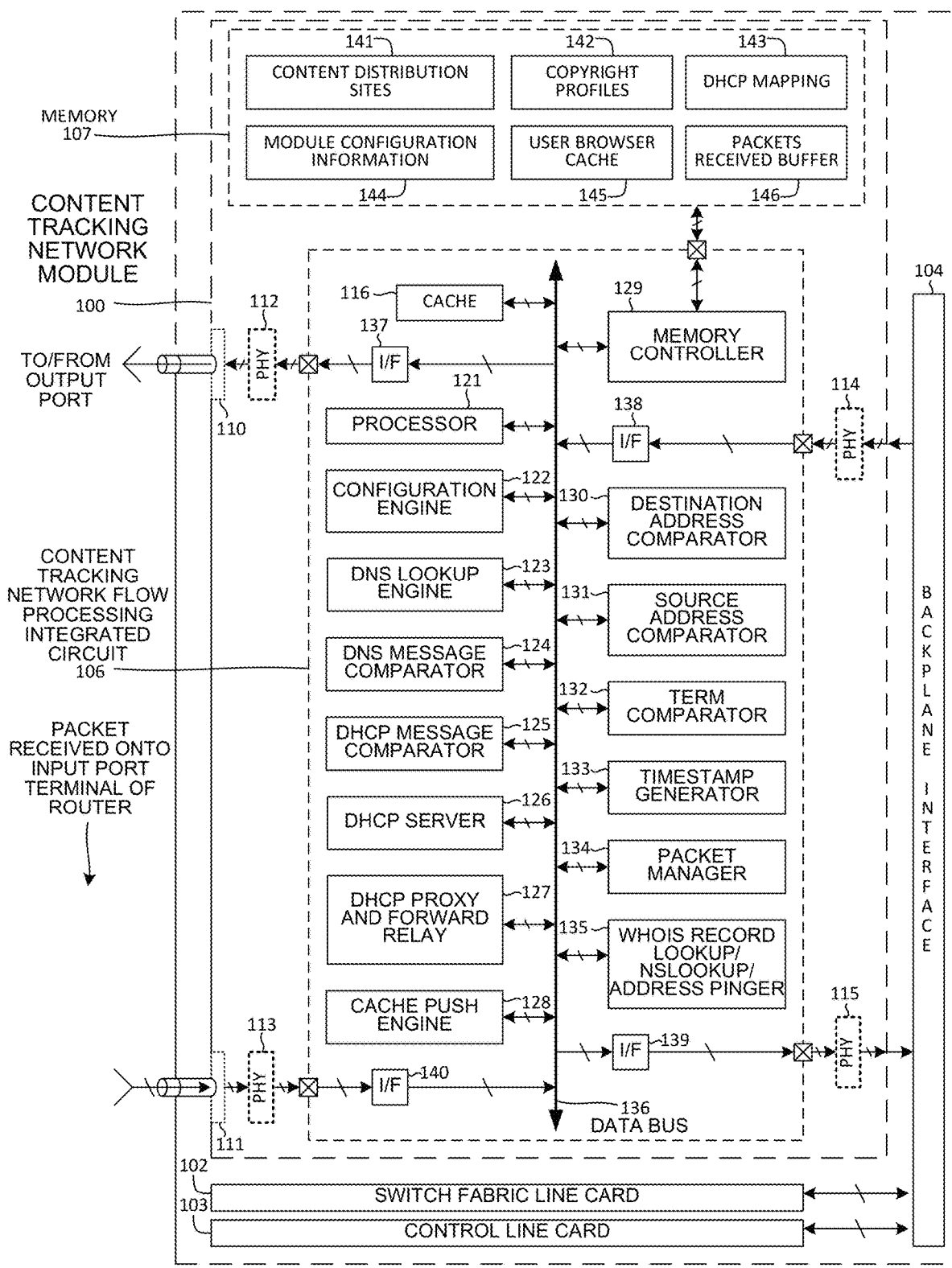
FIG. 11 is a detailed diagram of the content tracking network flow processing IC 106 and the memory 107 of the content tracking network module 100.

FIG. 11 is a detailed diagram of the content tracking network flow processing IC 106 and the memory 107 of the content tracking network module 100. The content tracking network flow processing IC 106 comprises the cache 116, processor 121, a configuration engine 122, a Domain Name System (DNS) lookup engine 123, a DNS message comparator 124, a DHCP message comparator 125, a DHCP server 126, a DHCP proxy and forward relay 127, a cache push engine 128, a memory controller 129, a destination address comparator 130, a source address comparator 131, a term comparator 132, a timestamp generator 133, a packet manager 134, a WHOIS record lookup, NS lookup, and address pinger 135, a data bus 136, and interface circuits 137-140. The memory 107 of the content tracking network module 100 is a structure of memory that comprises content distribution sites 141, copyright profiles 142, DHCP mapping 143, module configuration information 144, user browser cache 145, and a packets received buffer 146.

The processor 121 is attached to data bus along with all the other engine components of the copyright processor. It is responsible for setting up the structures in memory device of FIG. 12 by means of the memory controller 129, as well as setting up and programming the individual hardware engines within the packet processor. Up to 64 engines may be supported by the processor 121, in either dedicated hardware or software. In various embodiments it can be used to perform specialized, programmed functionality by means of code downloaded from the content tracking system 51, as well as perform the functions of one or more of the described engine components described in this illustration.

The configuration engine 122 reads an external configuration file or memory that resides on the system host in which the module resides which may be configured by means of an I/O terminal supported by the programmable processor 121, and a file, disk memory supported by the programmable processor 121. The configuration engine 122 may also be configured for DHCP/Bootp to bootstrap directly from the specified content tracking system. The specified content tracking system may be specified as a URL or a static internet IP address and password as either bootstrap options in memory or in a file. The configuration engine 122 configuration memory typically contains any bootp or DHCP boot options, the content tracking system URL or direct IP address, primary and secondary local DNS server addresses. The configuration information 144 includes which of the high bandwidth packet interfaces 105 on the module are to be configured and how they are to be used, including their basic configuration and addressing. The configuration engine 122 also configures the packet interfaces 105 with addresses either statically configured in the config or via DHCP. One or more of the packet interfaces 105 are configured as specialized interfaces used by the packet processor to communicate with the content tracking system 52 and the surrounding world. If DHCP is specified for an interface then the configuration engine will run a DHCP Client and send a DHCP Discovery for those interfaces. Configuration information 144 is obtained by the configuration engine at boot time from local disk or boot memory stored in the memory 107. The configuration information 144 also have additional values including but not limited to TimeCachePush (Time cache push), TimeCacheAge (Time cache age), CacheSize, DHCPServer Enable and configuration, content tracking system Refresh Time, DHCP Proxy Enable and configuration, remote DNS Lookup Enable, and other additional values all of which may be overwritten or modified after contact with the DCT. Once the specialized interfaces have addresses associated with them, then the configuration module will either call on the DNS Lookup engine to issue a resolution for the content tracking system URL ("content-tracking-system.com", for example), or access the content tracking system 51 with an IP address if it was directly provide in the config. The configuration engine 122 will then login into the content tracking system site with the username and password provided in the config. It then validates its configuration with the content tracking system 51 and modifies the memory 107, if needed. The configuration engine 122 then downloads the content distribution sites 141 lists, as well as any copyright profiles 142 if they are present from the content tracking system 51. Any one or all of the content distribution lists may be present for download. Zero or more copyright profiles may be available. The configuration engine 122 will then go to the content tracking system 51 every RefreshTime and check for any updates to the content distribution lists 141 or copyright profiles 142. The configuration engine 122 may also update any of its values in the memory 107 at this time, changing the behavior of the processor 121 and entire system.

The DNS lookup engine 123 performs lookup requests for domains in URL's. The DNS lookup engine 123 is used to initially resolve the address of the content tracking system 51. If configured and enabled on timer TimerDNSLookupInterval with configuration information 144, it may be used to resolve the URL's in the content distribution site list 141 and distribution URLs copyright profile which had been downloaded from the content tracking system 51. In this mode, it adds to any of the addresses it resolves to the address list under each of the URL entries elements in content distribution lists 141 or copyright profiles 142.

The configuration engine 122 may also setup up the DNS engine 123 to use one of the packet interfaces 105 for access as a DNS server to the surrounding network (users have this entry as their primary DNS server). In this mode it actually functions as a proxy/relay for requests and responses to and from the primary and secondary DNS servers in module configuration information 144, giving it direct access to monitor user requests for any of the URLS in content distribution lists 141 or copyright profiles 142. If a hit is detected on content distribution lists 141 or copyright profiles 142, then the DNS lookup engine 123 adds the entry to the address list under that URL entry/element and then sends the packet and notification to the destination address engine 130. The DNS engine 123 can also be configured to drop the request and prevent user access to sites. The DNS lookup engine 123 may run in this mode in parallel with the DNS message comparator 124.

The DNS message comparator 124 intercepts all DNS query question and answer packets on the packet input ports 105. Any top level domain name URL's are intercepted and compared with the content distribution list 141 and the designated copyright URL copyright profiles list 142. If they match the entry/elements, the address of the DNS answers (resolved destination addresses) are compared to the address lists under the matching URL entry/element. If it is a new entry in which the address is not in any of the listed in the address, the intercepted packet is then forwarded to the destination address comparator 130.

The DHCP message comparator 125 Intercepts discovery, offer, request, ACK and all other DHCP message on the packet input ports 105 and places the results in DHCP mapping 143. These correspond to the MAC address mapping to source address of the users at the module site.

The DHCP server 126 operates such that if the DHCP enable flag is set in the module configuration information 144 along with DHCP server parameters, the copyright processor may be configured to provide a DHCP server, granting MAC to IP address leases. This information is stored in the DHCP mapping memory 143. If configured and enabled, the server utilizes one of the packet input ports 108,105. In this case the port will not be used for snooping but to actually function as a dedicated interface to the DHCP server. The DHCP proxy and forward relay 127 if configured and enabled, utilizes one or more of the packet input ports 108,105.

The cache push engine 128, on the configured time interval TimeCachePush in the module configuration information 144, pushes the contents of the user browser cache 145 up to the content tracking system 51 with acknowledgement, and then clears the uploaded entries from the cache. If the DHCP mapping 143 is available, then the cache push engine 128 is optionally configured by module configuration information 144 to push updated copies of that as well. The cache push engine 128 may also be configured to upload other information by the configuration engine changes to cache config memory on the content tracking system 51 update interval.

The memory controller 129 is a hardware controller that manages the interface between the data bus 136 in processor 121 and the memory 107. The memory controller 129 is configured by means of the processor 121 through which all the memory data structures 141-146 are set up for use by the various engines of module 100.

The destination address comparator 130 operates in conjunction with the source address comparator engine 131. The destination address comparator 130 takes destination addresses from a packet arriving on input ports (for example, 108) and compares it to all of the addresses lists under the URL entries/elements in content distribution lists 141 or copyright profiles 142. If there is a match, then destination address comparator 130 calls source address comparator 131 and forwards the packet to the source address comparator 131. The destination address comparator 130 also accepts packets from the DNS message comparator 124. This ensures that new DNS interceptions are not missed.

The source address comparator 131 receives packets from three sources: the packet input ports 108,105, the destination address comparator 130, and the term comparator 132. The source address comparator 131 creates and updates the user browser cache list 145. All packets received from packet input ports 108,105 are checked against all user browsing cache 145 source address entries/elements. If there is a source address match, then the destination address is checked to see if it is in the destination address list under the source address element. If it is, then the upload byte count is updated. If it is not, then it is added to the destination address list in the cache and the number of upload bytes count is initialized with the number of bytes in this packet.

The destination address of the packet is also checked to see if it matches, any of the user browsing cache 145 source address entries/elements. If it does, the source address of the packet is then checked to see if it matches any of the destination addresses under this source address element. If it does, the download byte count is updated. If not, it is added to the destination address list and the download byte count is initialized with the number of bytes for this packet. If both of the two checks a) and b) fail, then the packet is discarded.

If a packet is received from the destination address comparator 130, and if the source address of the packet already exists in the user browsing cache 145 source entries/elements, then the destination address is checked to see if it is in the destination address list under the source address element. If it is, then the upload byte count is updated. If it is not, then it is added to the destination address list and the number of upload bytes count is initialized with the number of bytes in this packet. If it is not, then a new source address entry/elements is created along with a time stamp and the number of upload bytes is initialized with the number of bytes in this packet. The TimeCacheAge (not shown in figures) entry is initialized for this user source address tracking entry/element.

If the packet is received from term comparator 132, if the source address of the packet already exists in user browsing cache 145 source entries/elements, the destination address is checked to see if it is in the destination address list under the source address element. If it is, then the upload byte count is updated. If it is not, then it is added to the destination address list and the number of upload bytes count is initialized with the number of bytes in this packet. If it is not, then a new source address entry/elements is created along with a time stamp and the number of upload bytes is initialized with the number of bytes in this packet. The TimeCacheAge entry is initialized for this user. The destination address of the packet is also checked to see if it matches, any of the user browsing cache 145 source address entries/elements. If it does, then the source address of the packet is then checked to see if it matches any of the destination addresses under this source address element. If it does, then the download byte count is updated. If not, then it is added to the destination address list and the download byte count is initialized with the number of bytes for this packet. The source address comparator 131 can also be configured by configuration engine 122 to save packet contents.

The term comparator 132 examines the full URLs if available, does a deep packet inspection for keywords and terms as well as looks at the protocol headers and ports within the packet. The term comparator 132 uses the terms, ports, protocol and other information in copyright profiles 142 to do this. If it triggers on a match, it sends the packet to the destination address comparator 130. The term comparator 132 engine is most effective without encryption and secure sockets as using https, since the full URL and payload will only be available if unencrypted.

The term comparator 132 does, however, maintain a history of packet sequences between destination and source address pairs regardless of there is encryption or not or if there is a term, port, or protocol trigger or not. If configured in module configuration information 144, it builds a traffic pattern profile utilizing timestamp engine 133 along with the number of upload and download bytes between the address pairs to profile activity to and from a specific addresses in the lists under URL entries/elements in content distribution lists 141 or copyright profiles 142. This information is written an entry in the user browser cache 145 to be pushed back to the content tracking system 51.

The timestamp generator 133 offers timestamp support to processor 121 as well as all the other engines in the module 100. The accurate time which events occur and are stamped in user browsing cache 145 is critical to be able to correlate time value piracy events with the content tracking system 51, especially because the module may reside a in different time zones within a host that may not have access to the correct global time. The timestamp generator 133 is synchronized with the content tracking system 51 during each of the configuration engines DCTRefreshTime interval. It can be configured to synchronize with the content tracking system 51 or use global positioning timing, IEE1588 timing, module host timing, or other sources of timing by means of the module configuration information 144.

The packet manager 134 fills and maintains packets received from packet ports 108,105 to the engines and clearing packets using the flags from the packet receive buffer 146 after use by engines. It also is responsible for forwarding packets through the module 100 between interfaces if two or more port interfaces 105 are set in pass through mode by means of module configuration information 144. In this mode it can also be configured to filter: drop or pass packets whose addresses match the current address lists in content distribution lists 141 or copyright profiles 142.

The WHOIS record lookup, NS lookup, and address pinger 135 engine, in addition to the DNS lookup engine 123, can be run by processor 121. The WHOIS record lookup, NS lookup, and address pinger 135 is configured and operated by means of commands from the content tracking system 51 by means of the configuration engine 122 during a DCTRefresh time interval. This engine receives explicit instructions to do one or more record lookups on a URL, reverse lookups on one or more specific IP addresses, and ping specific IP addresses to see if they are reachable, and places the results in the user browser cache 145 for push back to the content tracking system 51 during the next TimeCachePushInterval. This allows the content tracking system 51 to use the module location for a specific view of the network that may not be visible to the web crawling engine 84 at the content tracking system 51 due to geolocation DNS restrictions, IP addresses without DNS entries, and discover sites that are in the dark web. This information is then sent back to the content tracking system 51, greatly increasing its power an effectiveness.

The specialized interfaces are used by the copyright processor to communicate with its surroundings through local network subnet/segment. Whereas one or more of the remaining packet interfaces 105,108 are used for snooping and other special module functionality (DHCP Server or DNS Server Proxy as illustrative examples), these specialized interfaces are used exclusively by the packet processor for its own configuration and maintenance. These specialized interfaces are used as local access to the module 100 and processor 121 for configuration and other purposes. It is used by the module 100 for accessing the content tracking system 51, as well as run DNS Lookups for its own use and the DNS Lookup for the content distribution lists 141 or copyright profiles 142 during the TimeDNSLookupInterval, if that is configured.

Figure 12:
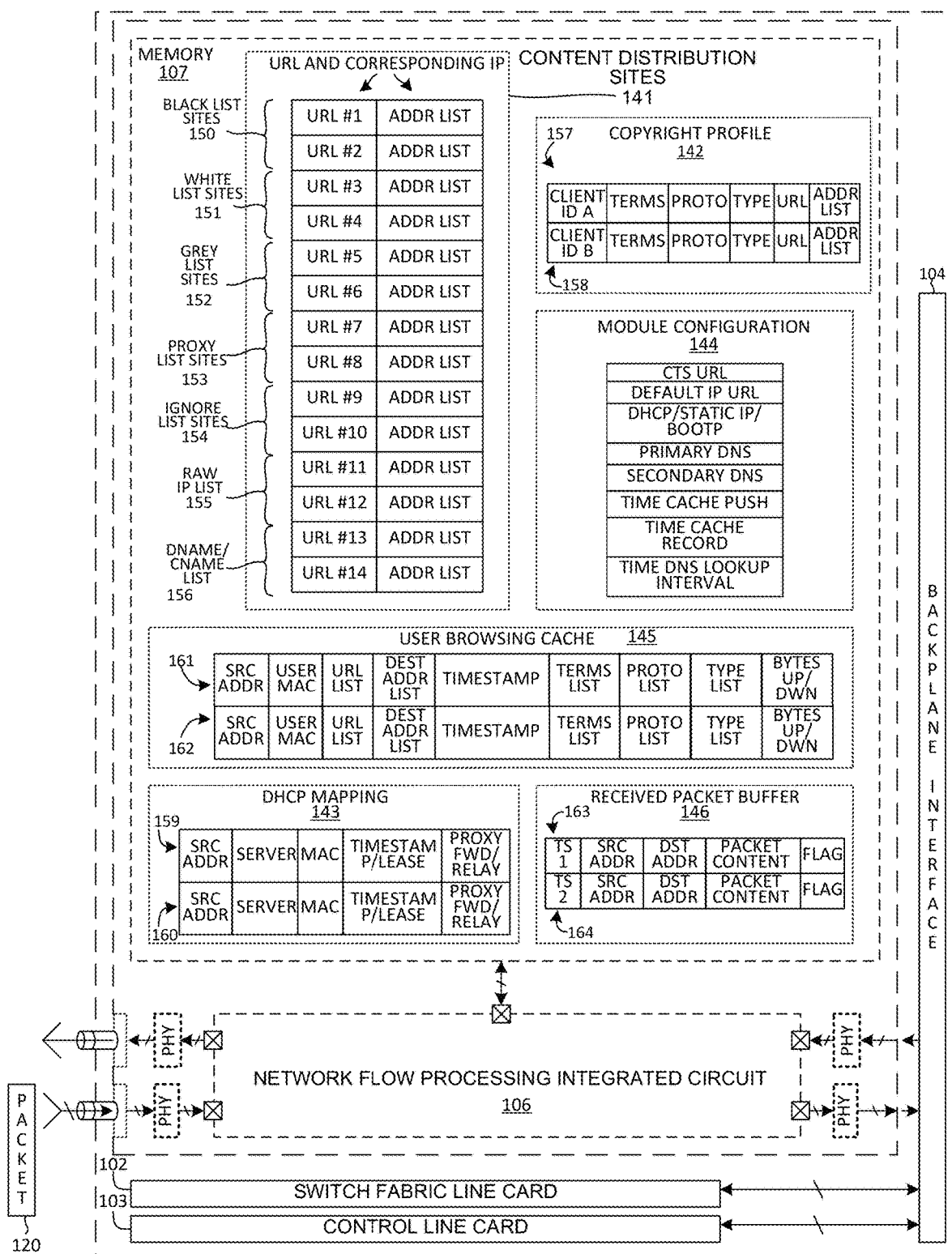
FIG. 12 is a more detailed diagram of the memory 107 of the content tracking network flow processing integrated circuit 106.

FIG. 12 is a more detailed diagram of the memory 107 of the content tracking network flow processing integrated circuit 106. The content distribution sites 141 stored in memory 107 include blacklist sites and corresponding IP address lists 150, whitelist sites and corresponding IP address lists 151, greylist sites and corresponding IP address lists 152, proxylist sites and corresponding IP address lists 153, ignore list sites and corresponding IP address lists 154, raw IP list sites and corresponding IP address lists 155, and DNAME/CNAME list sites and corresponding IP address lists 156. The content distribution sites 141 stored in memory 107 may contain a number of lists. Each list element is comprised of a URL associated that has its own list of addresses associated with it. This example uses both IPV4 and IPV6 addresses, but in various embodiments other types of addresses may be used. The URLs can be top level domains (pirateme.com as an illustrative example) or full URLs (pirateme.com/instructionals/page/?download=1 as an illustrative example).

The copyright profile 142 information stored in memory includes client ID information, terms related to content to track, protocols associated with the content to track, type information for the content, and the URL and corresponding IP addresses for the content. The copyright profile 142 shown in FIG. 12 includes two records 157 and 158. Each of the list elements contains the client ID as well as a list of filterable terms, as well as a list of URLs (top level domain or full url) that are allowed distribution sites for the copyright content. Examples of terms for John Jacobs renovation instructional videos might be "John Jacobs" and "Kitchen" and "instructional". Protocols listed to search for might be RTSP (Real time streaming protocol). An example of Ports might be 6881-6889 corresponding with present Torrent streaming ports.

The DHCP mapping information stored in the memory 107 includes source address information, server information, MAC address information, timestamp and lease information, and proxy forwarding and relay information. The DHCP mapping information 143 shown in FIG. 12 includes two records 159 and 160 for illustrative purposes. If DHCP Server engine or DHCP proxy/forwarding is enabled, the DHCP mapping information 143 comprises a list of granted addresses and the MAC addresses associated with them as last seen/known to this module.

The module configuration information 144 stored in the memory 107 includes content tracking system URL information, default IP URL information, DHCP, static IP, and bootp information, primary and secondary DNS information, time cache push information, time cache record information, and time DNS lookup interval.

The user browser cache information 145 stored in the memory 107 includes source address, user MAC address, URL list, destination address list, timestamp information, terms list, protocol list, content type list, and bytes uploaded and downloaded information. The user browser cache information 145 shown in FIG. 12 includes two records 161 and 162 for illustrative purposes. The user browser cache information 145 comprises elements based on the source address of a potential pirate user of interest, as well as a list of URLs accessed by the source address, first of destination addresses, and copyright terms, types and protocols if available. Each entry is accompanied by a timestamp from timestamp module 133. Elements are added by the source address comparator engine 131, each for duration TimeCacheAge. They are removed by Cache Push Engine 128 every TimeCachePush interval.

The received packet buffer 146 comprises timestamp ID information, source address information, destination address information, packet content, and flag information. The received packet buffer 146 shown in FIG. 12 includes two records 163 and 164 for illustrative purposes. The buffer 146 is a queue for all packets being snooped coming into one or more of the packet input ports. Each element has the MAC packet and protocol header information as well as the payload. It also contains a 64-bit examination flag that is set by the configuration module 122, where bits indicate which one of the 64 possible running engines within the processor are to process the packet. Once the flag is zero, then the packet is discarded by the packet manager 134. Each engine may be configured to get a local copy of the packet within its own buffer, or run through the receive packet buffer in place. In either configuration once the individual engine has finished with the packet, then the associated bit is cleared. Individual packets or all packets may be discarded by processor 121 using packet manager 134.

The specialized interface circuits are used by the processor 121 to communicate with its surroundings through local network subnet/segment. The remaining input/output optical transceiver ports 105 interfaces are used for snooping and other special module functionality (DHCP Server or DNS Server Proxy as illustrative examples). The specialized interface circuits 137-140 are used exclusively by the packet processor 121 for its own configuration and maintenance. The specialized interface circuits 137-140 are used as local access to the module 100 and processor 121 for configuration and other purposes. The specialized interface circuits 137-140 are also used by the module 100 for access to the content tracking system 51, as well as run for DNS Lookups for its own use and the DNS Lookup for the content distribution sites 141 and copyright profiles 142 during the TimeDNSLookupInterval if that is configured.

Figure 13A:
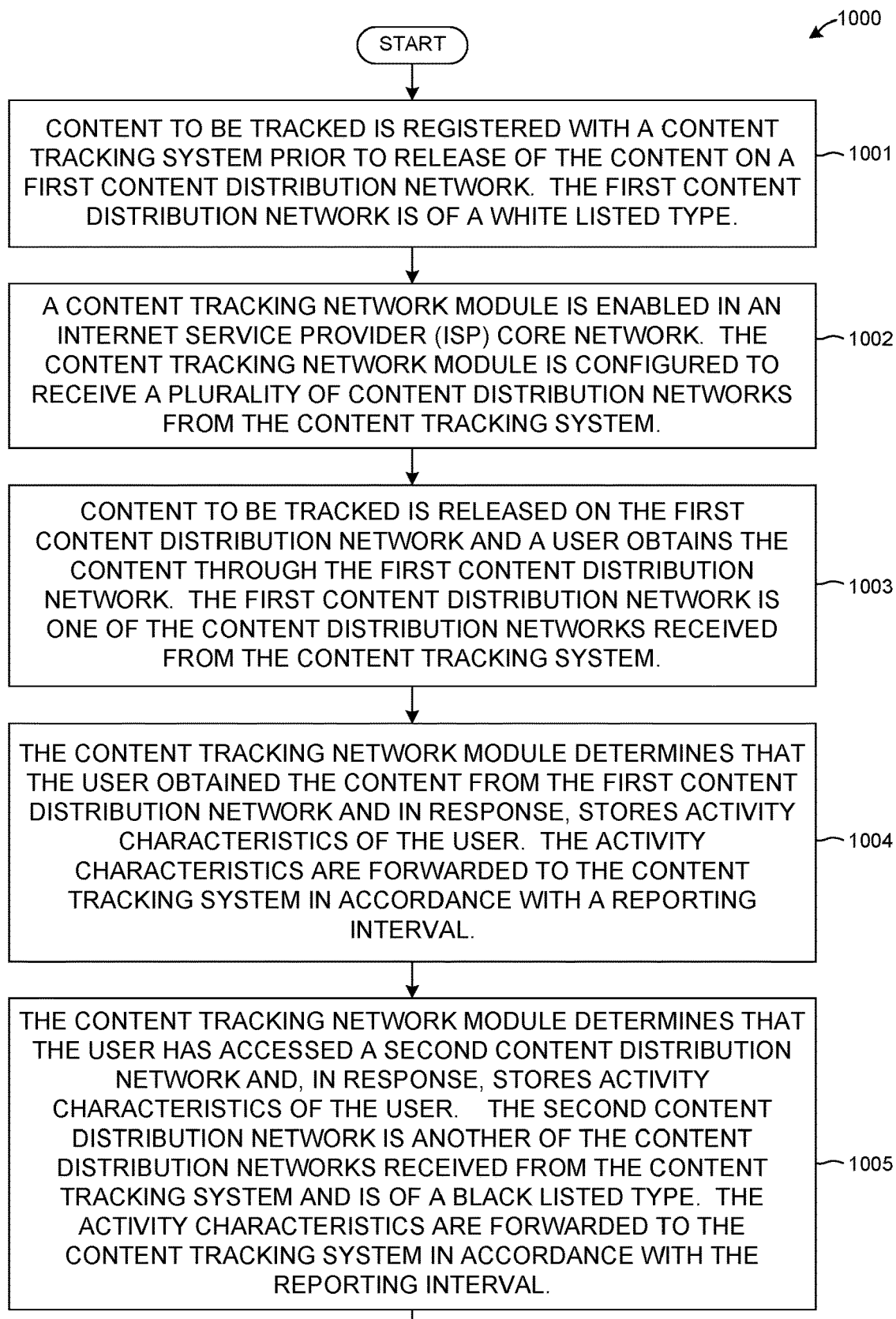
FIGS. 13A and 13B together form FIG. 13 which is a flowchart that illustrates a method 1000 in accordance with one novel aspect.
Figure 13B:
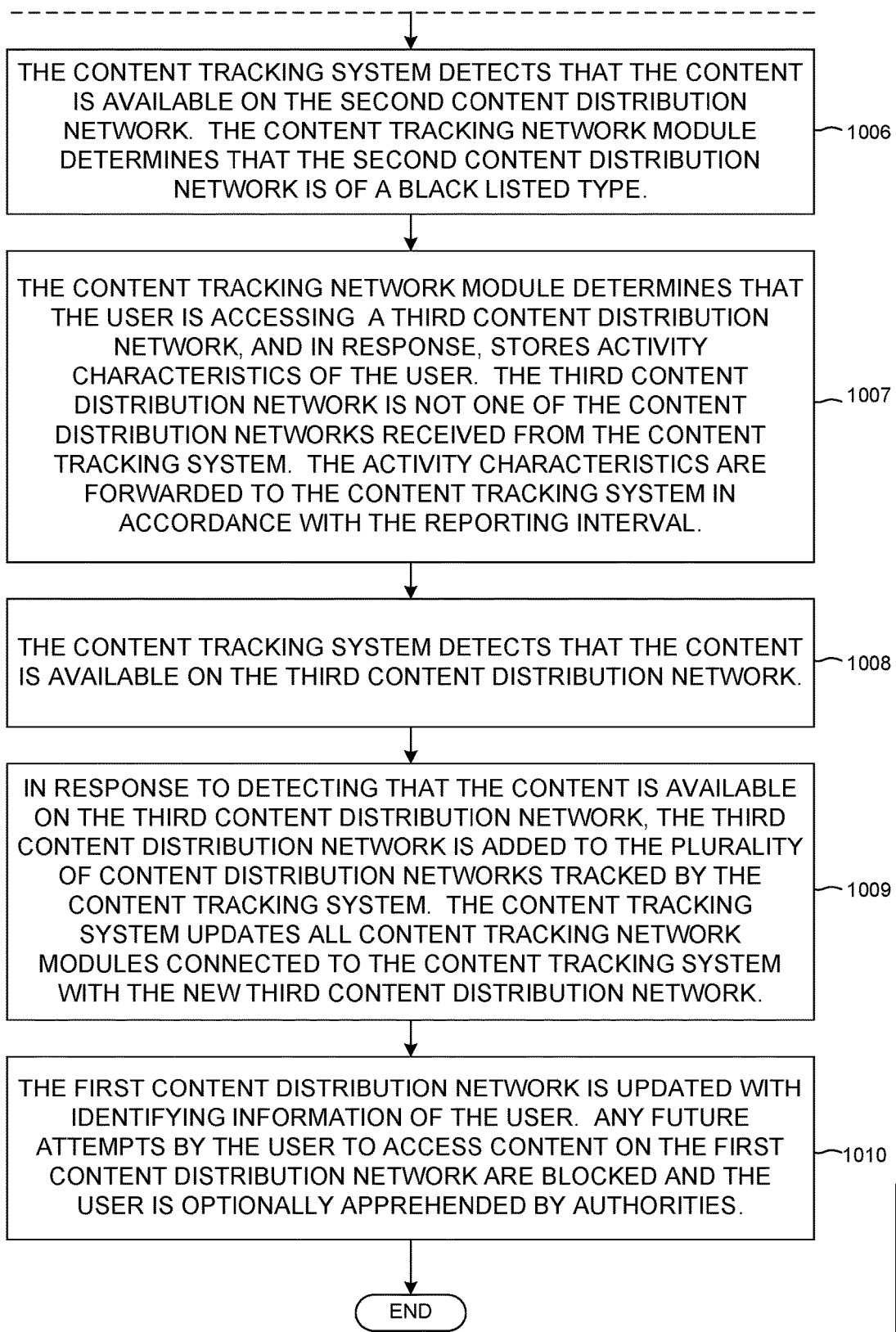

FIGS. 13A and 13B together form FIG. 13 which is a flowchart that illustrates a method 1000 in accordance with one novel aspect.

In a first step, (step 1001), content to be tracked is registered with a content tracking system prior to release of the content on a first content distribution network. The first content distribution network is of a white listed type.

In a second step, (step 1002), a content tracking network module is enabled in an Internet service provider (ISP) core network. The content tracking network module is configured to receive a plurality of content distribution networks from the content tracking system.

In a third step, (step 1003), content to be tracked is released on the first content distribution network and a user obtains the content through the first content distribution network. The first content distribution network is one of the content distribution networks received from the content tracking system.

In a fourth step, (step 1004), the content tracking network module determines that the user obtained the content from the first content distribution network and in response, stores activity characteristics of the user. the activity characteristics are forwarded to the content tracking system in accordance with a reporting interval.

In a fifth step, (step 1005), the content tracking network module determines that the user has accessed a second content distribution network and, in response, stores activity characteristics of the user. The second content distribution network is another of the content distribution networks received from the content tracking system and is of a black listed type. the activity characteristics are forwarded to the content tracking system in accordance with the reporting interval.

In a sixth step, (step 1006), the content tracking system detects that the content is available on the second content distribution network. The content tracking network module determines that the second content distribution network is of a black listed type.

In a seventh step, (step 1007), the content tracking network module determines that the user is accessing a third content distribution network, and in response, stores activity characteristics of the user. The third content distribution network is not one of the content distribution networks received from the content tracking system. the activity characteristics are forwarded to the content tracking system in accordance with the reporting interval.

In an eighth step, (step 1008), the content tracking system detects that the content is available on the third content distribution network.

In a ninth step, (step 1009), in response to detecting that the content is available on the third content distribution network, the third content distribution network is added to the plurality of content distribution networks tracked by the content tracking system. The content tracking system updates all content tracking network modules connected to the content tracking system with the new third content distribution network.

In a tenth step, (step 1010), the first content distribution network is updated with identifying information of the user. Any future attempts by the user to access content on the first content distribution network are blocked and the user is optionally apprehended by authorities.

Figure 14A:
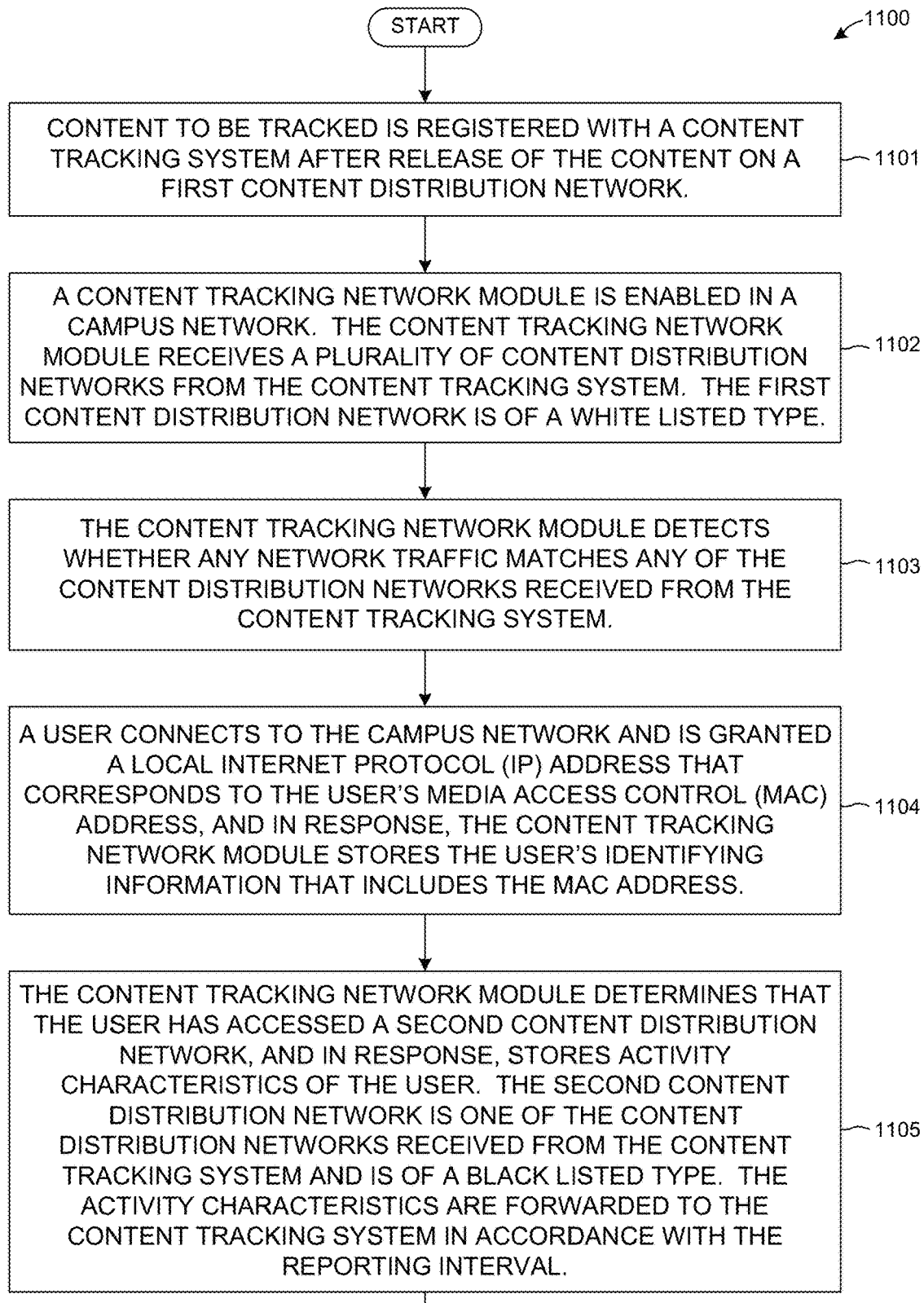

FIGS. 14A and 14B together form FIG. 14 which is a flowchart that illustrates a method 1100 in accordance with one novel aspect.

In a first step, (step 1101), content to be tracked is registered with a content tracking system after release of the content on a first content distribution network.

In a second step, (step 1102), a content tracking network module is enabled in a campus network. The content tracking network module receives a plurality of content distribution networks from the content tracking system. The first content distribution network is of a white listed type.

In a third step, (step 1103), the content tracking network module detects whether any network traffic matches any of the content distribution networks received from the content tracking system.

In a fourth step, (step 1104), a user connects to the campus network and is granted a local Internet Protocol (IP) address that corresponds to the user's media access control (MAC) address, and in response, the content tracking network module stores the user's identifying information that includes the mac address.

In a fifth step, (step 1105), the content tracking network module determines that the user has accessed a second content distribution network, and in response, stores activity characteristics of the user. The second content distribution network is one of the content distribution networks received from the content tracking system and is of a black listed type. the activity characteristics are forwarded to the content tracking system in accordance with the reporting interval.

In a sixth step, (step 1106), the content tracking network module determines that the user is accessing a third content distribution network and, in response, stores activity characteristics of the user. The third content distribution network is not one of the content distribution networks received from the content tracking system. the activity characteristics are forwarded to the content tracking system in accordance with the reporting interval.

In a seventh step, (step 1107), the content tracking system detects that the content is available on the third content distribution network.

In an eighth step, (step 1108), in response to detecting that the content is available on the third content distribution network, the third content distribution network is added to the plurality of content distribution networks tracked by the content tracking system. The content tracking system updates all content tracking network modules connected to the content tracking system with the new third content distribution network.

In a ninth step, (step 1109), the first content distribution network is updated with identifying information of the user. Any future attempts by the user to access content on the first content distribution network are blocked and the user is optionally apprehended by authorities.

Figure 15A:
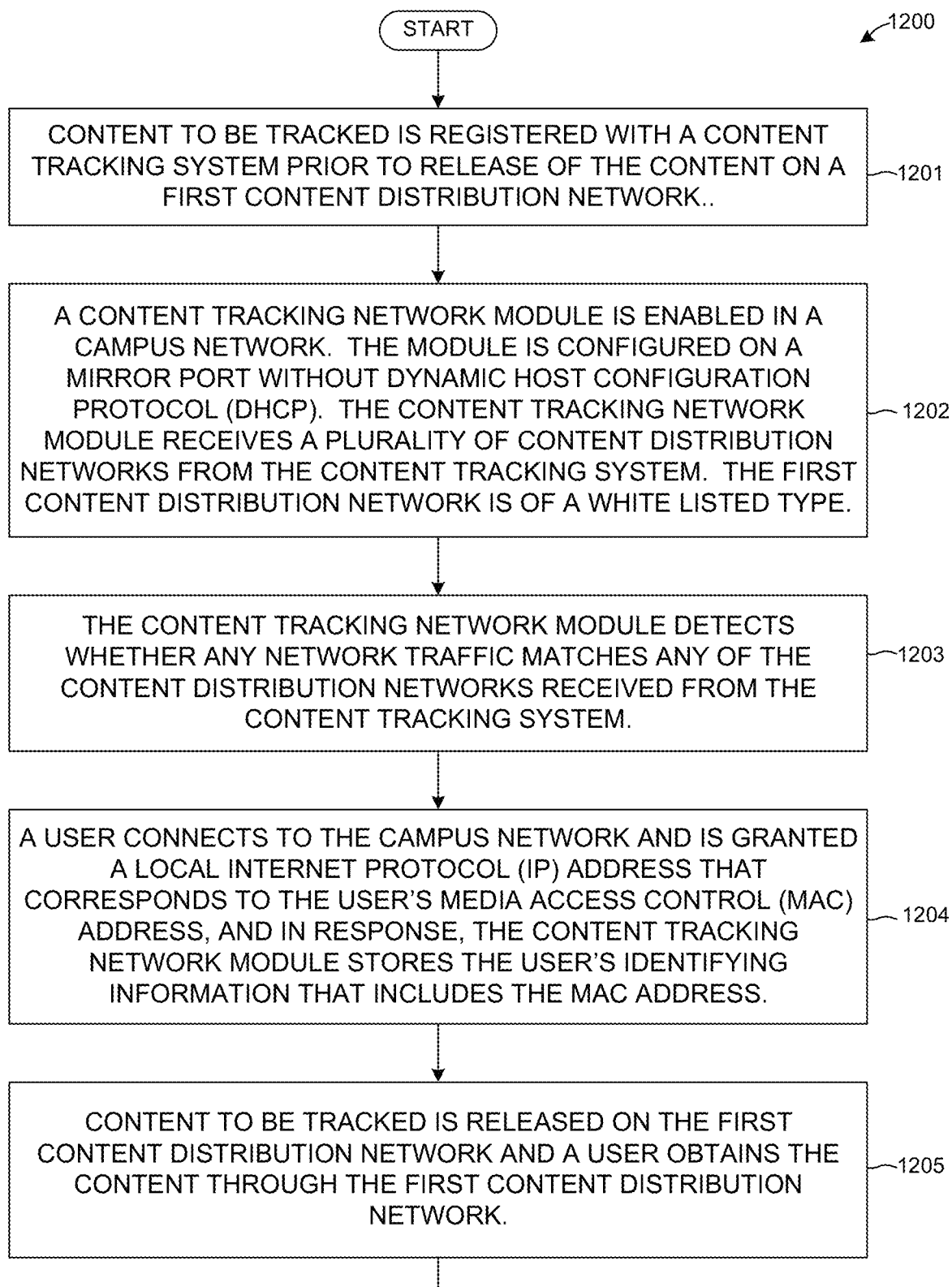
Figure 15B:
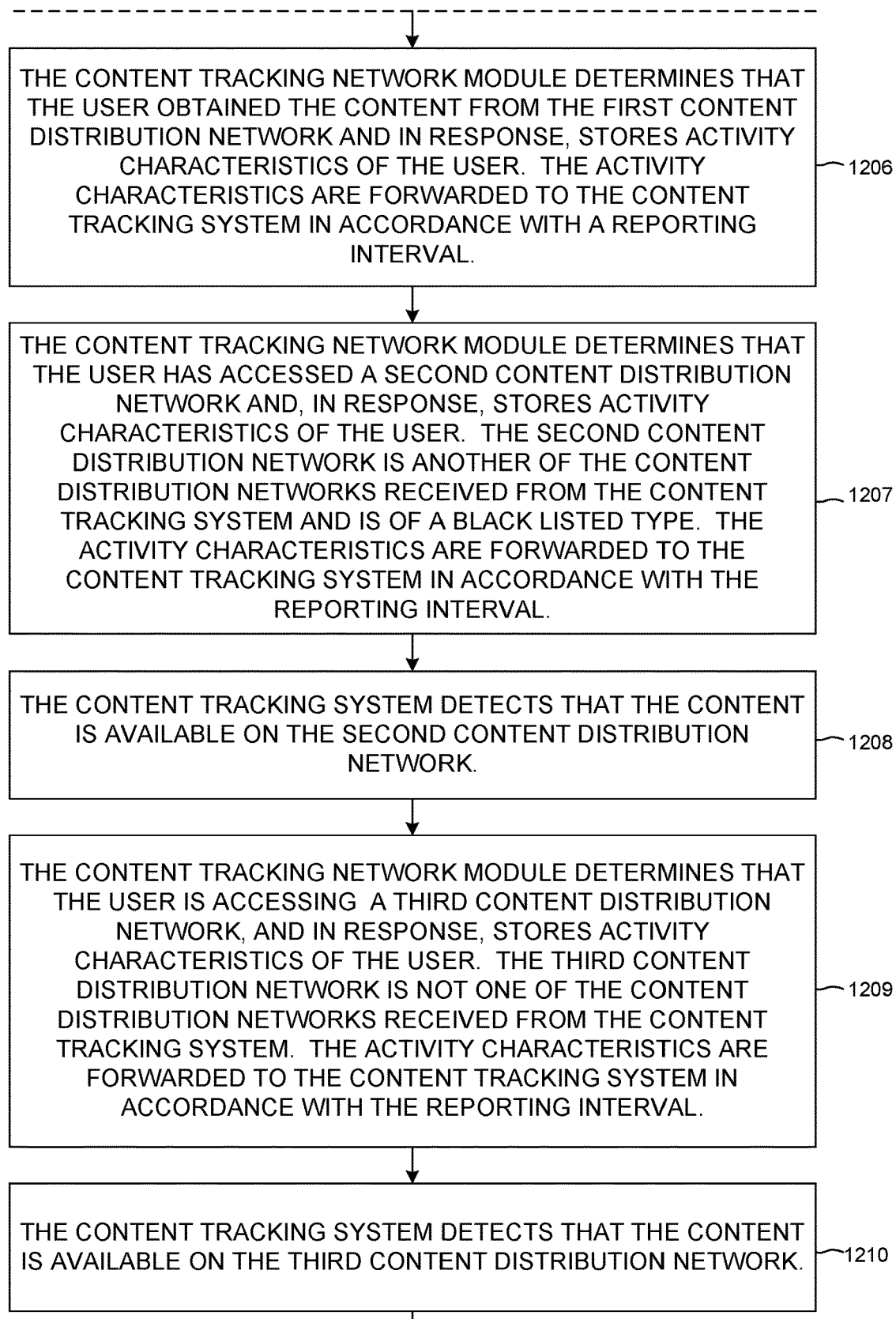

FIGS. 15A, 15B, and 15C together form FIG. 15 which is a flowchart that illustrates a method 1200 in accordance with one novel aspect.

In a first step, (step 1201), content to be tracked is registered with a content tracking system prior to release of the content on a first content distribution network.

In a second step, (step 1202), a content tracking network module is enabled in a campus network. The module is configured on a mirror port without Dynamic Host Configuration Protocol (DHCP). The content tracking network module receives a plurality of content distribution networks from the content tracking system. The first content distribution network is of a white listed type.

In a third step, (step 1203), the content tracking network module detects whether any network traffic matches any of the content distribution networks received from the content tracking system.

In a fourth step, (step 1204), a user connects to the campus network and is granted a local Internet Protocol (IP) address that corresponds to the user's media access control (MAC) address, and in response, the content tracking network module stores the user's identifying information that includes the mac address.

In a fifth step, (step 1205), content to be tracked is released on the first content distribution network and a user obtains the content through the first content distribution network.

In a sixth step, (step 1206), the content tracking network module determines that the user obtained the content from the first content distribution network and in response, stores activity characteristics of the user. the activity characteristics are forwarded to the content tracking system in accordance with a reporting interval.

In a seventh step, (step 1207), the content tracking network module determines that the user has accessed a second content distribution network and, in response, stores activity characteristics of the user. The second content distribution network is another of the content distribution networks received from the content tracking system and is of a black listed type. the activity characteristics are forwarded to the content tracking system in accordance with the reporting interval.

In an eighth step, (step 1208), the content tracking system detects that the content is available on the second content distribution network.

In a ninth step, (step 1209), the content tracking network module determines that the user is accessing a third content distribution network, and in response, stores activity characteristics of the user. The third content distribution network is not one of the content distribution networks received from the content tracking system. the activity characteristics are forwarded to the content tracking system in accordance with the reporting interval.

In a tenth step, (step 1210), the content tracking system detects that the content is available on the third content distribution network.

In an eleventh step, (step 1211), in response to detecting that the content is available on the third content distribution network, the third content distribution network is added to the plurality of content distribution networks tracked by the content tracking system. The content tracking system updates all content tracking network modules connected to the content tracking system with the new third content distribution network.

In a twelfth step, (step 1212), the first content distribution network is updated with identifying information of the user. Any future attempts by the user to access content on the first content distribution network are blocked and the user is optionally apprehended by authorities.

Figure 16A:
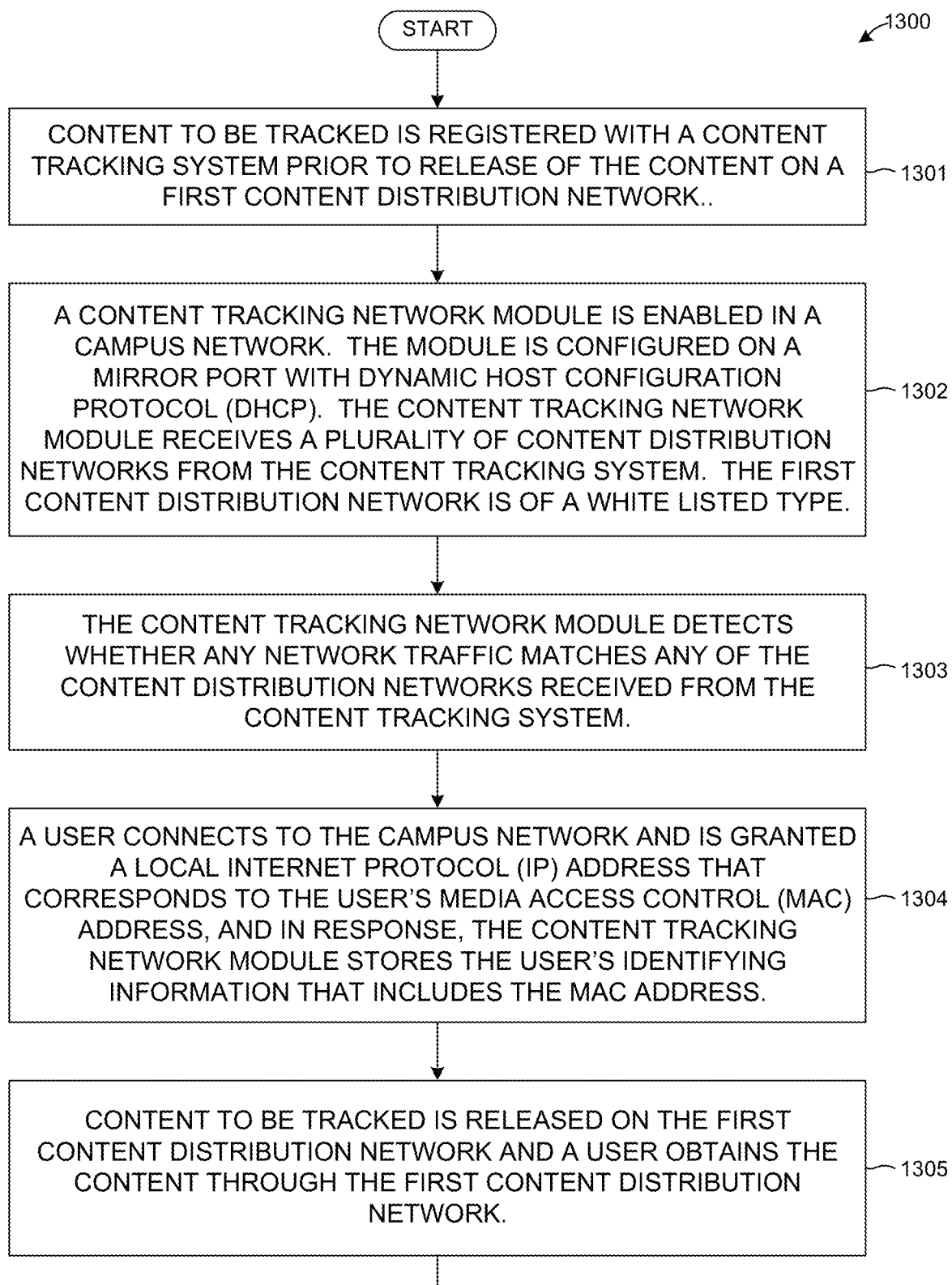
Figure 16B:
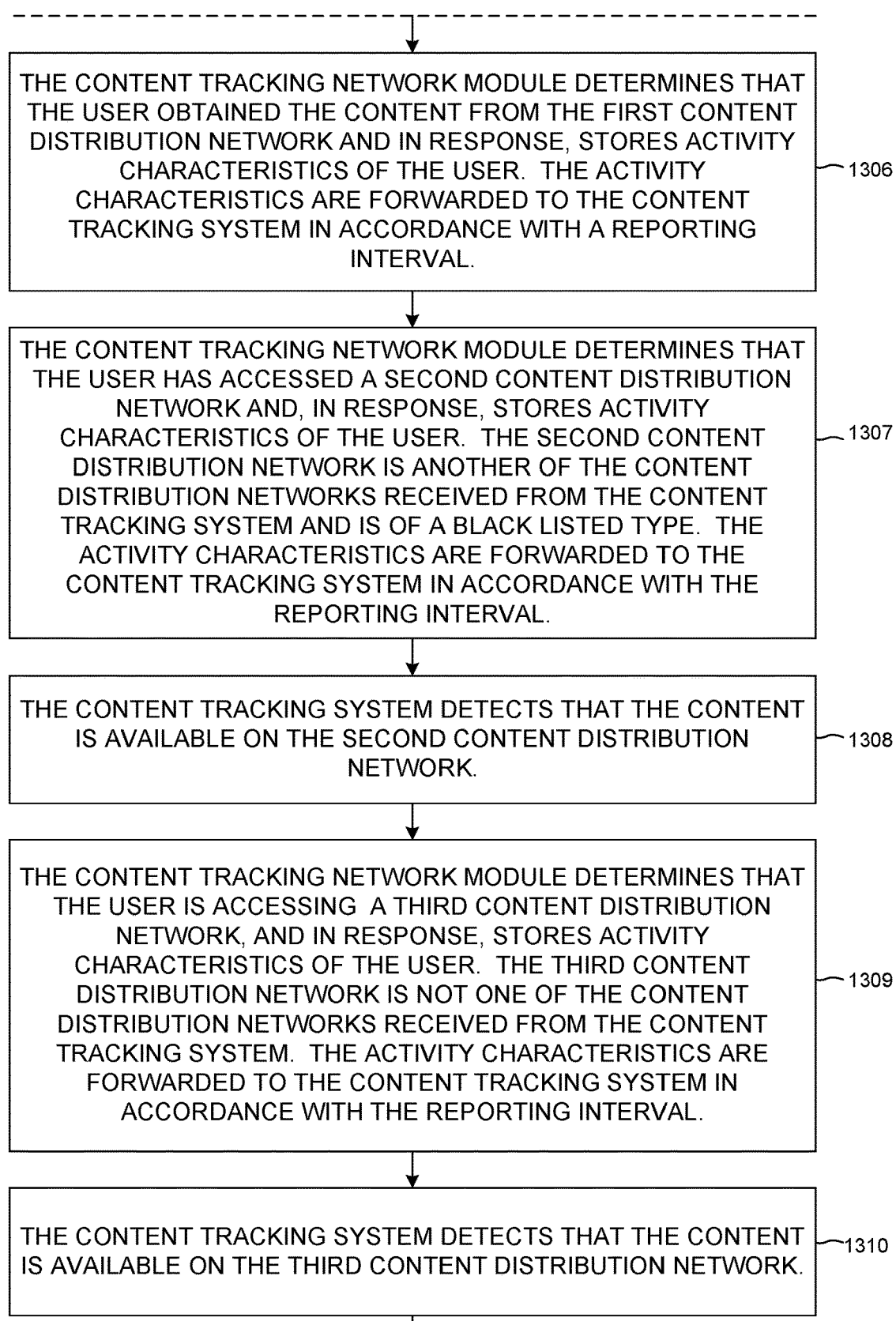

FIGS. 16A, 16B, and 16C together form FIG. 16 which is a flowchart that illustrates a method 1300 of flow in accordance with one novel aspect.

In a first step, (step 1301), content to be tracked is registered with a content tracking system prior to release of the content on a first content distribution network.

In a second step, (step 1302), a content tracking network module is enabled in a campus network. The module is configured on a mirror port with Dynamic Host Configuration Protocol (DHCP). The content tracking network module receives a plurality of content distribution networks from the content tracking system. The first content distribution network is of a white listed type.

In a third step, (step 1303), the content tracking network module detects whether any network traffic matches any of the content distribution networks received from the content tracking system.

In a fourth step, (step 1304), a user connects to the campus network and is granted a local Internet Protocol (IP) address that corresponds to the user's media access control (MAC) address, and in response, the content tracking network module stores the user's identifying information that includes the mac address.

In a fifth step, (step 1305), content to be tracked is released on the first content distribution network and a user obtains the content through the first content distribution network.

In a sixth step, (step 1306), the content tracking network module determines that the user obtained the content from the first content distribution network and in response, stores activity characteristics of the user. the activity characteristics are forwarded to the content tracking system in accordance with a reporting interval.

In a seventh step, (step 1307), the content tracking network module determines that the user has accessed a second content distribution network and, in response, stores activity characteristics of the user. The second content distribution network is another of the content distribution networks received from the content tracking system and is of a black listed type. the activity characteristics are forwarded to the content tracking system in accordance with the reporting interval.

In an eighth step, (step 1308), the content tracking system detects that the content is available on the second content distribution network.

In a ninth step, (step 1309), the content tracking network module determines that the user is accessing a third content distribution network, and in response, stores activity characteristics of the user. The third content distribution network is not one of the content distribution networks received from the content tracking system. The activity characteristics are forwarded to the content tracking system in accordance with the reporting interval.

In a tenth step, (step 1310), the content tracking system detects that the content is available on the third content distribution network.

In an eleventh step, (step 1311), in response to detecting that the content is available on the third content distribution network, the third content distribution network is added to the plurality of content distribution networks tracked by the content tracking system. The content tracking system updates all content tracking network modules connected to the content tracking system with the new third content distribution network.

In a twelfth step, (step 1312), the first content distribution network is updated with identifying information of the user. Any future attempts by the user to access content on the first content distribution network are blocked and the user is optionally apprehended by authorities.

Figure 17:
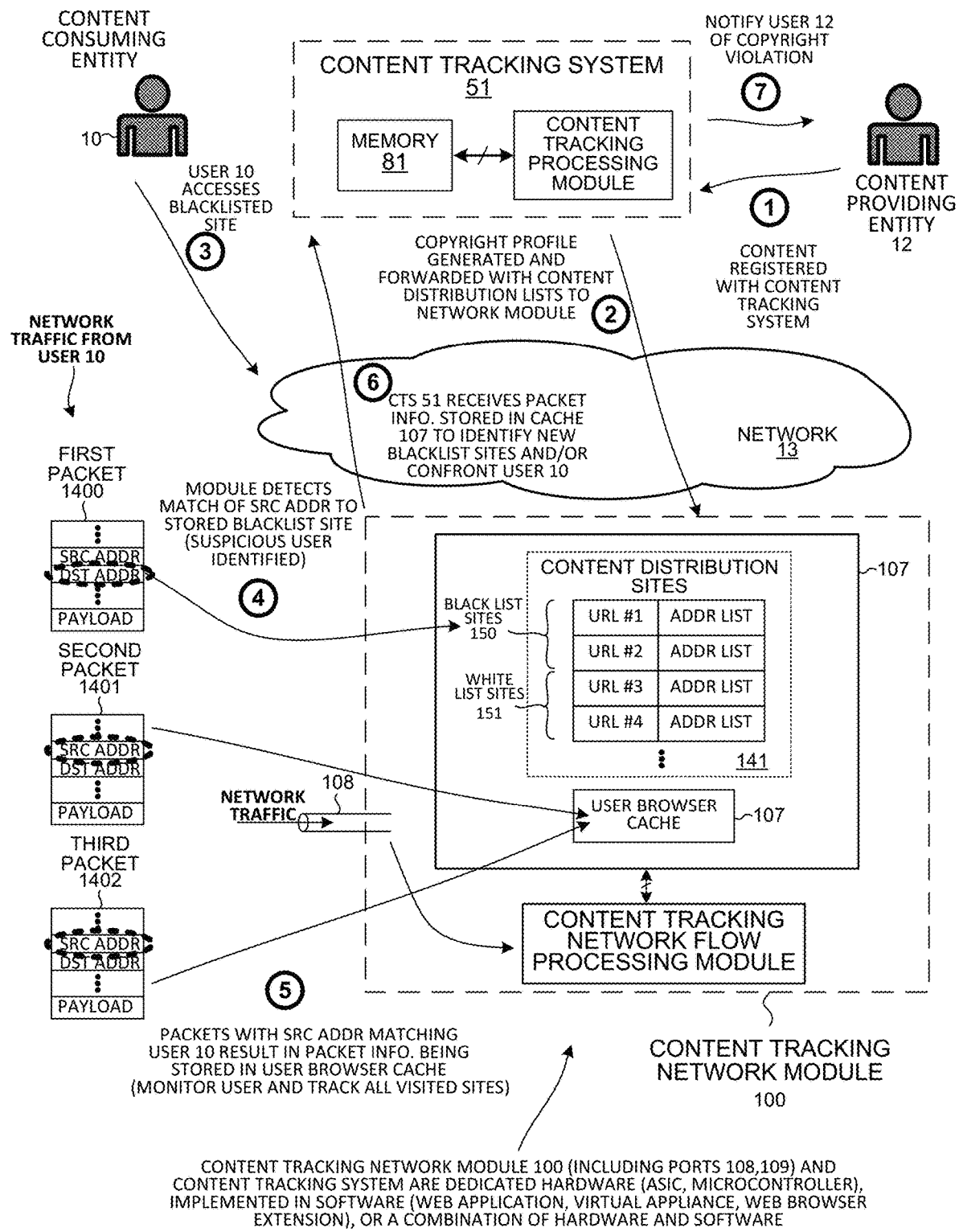
FIG. 17 is a diagram that shows how the content tracking network module 100 and the content tracking system 51 interact to reduce piracy across the network 13.

FIG. 17 is a diagram that shows how the content tracking network module 100 and the content tracking system 51 interact to reduce piracy across the network 13.

Figure 18:
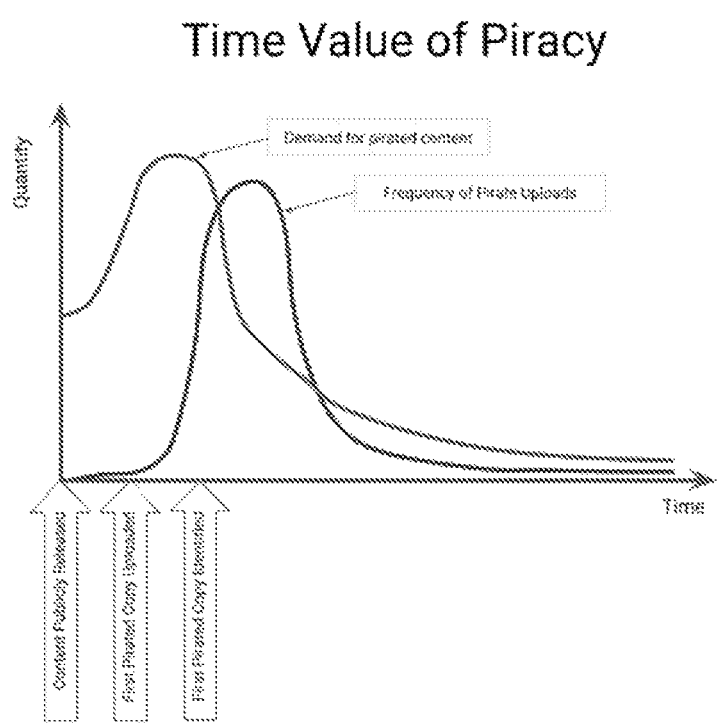
FIG. 18 is a line graph that shows the piracy value of uploaded content as a function of time.

FIG. 18 is a line graph that shows the piracy value of uploaded content as a function of time.

Although the present invention has been described in connection with certain specific embodiments for instructional purposes, the present invention is not limited thereto. For example, after the content tracking network flow processing module forwards the stored packet information to the content tracking system, the content tracking system uses the packet information to form a behavior profile for a user. The behavior profile indicates types of web content that the user accesses, for example, specific types of product, clothing or travel sites. The content tracking system provides the behavior profile of the user to an external entity. The external entity might pay monetary compensation in exchange for the behavior profiles. In one example, the external entity then uses the behavior profile to target advertising to the user. In another example, the external entity is a fraud detection entity and uses the behavior profile to determine the likelihood that a user committed fraud. In another example, the use of alternative profiles by the content tracking network module can detect brand affinity and usage. The content tracking system builds a behavior profile of the users product affinity.

In addition, the content distribution network information is not limited to web sites with video content. In other embodiments, the content distribution network information includes network information that provides access to at least one of retail web sites, streaming content, image content, audio playback content, and video content.

In another example, the modules store content profile information instead of copyright profile information. The content profile information can be changed to reflect a branding profiles, physical and digital product profiles and authorized resale distribution networks. The use of alternative profiles by the content tracking network module can detect brand infringement and fraud. Accordingly, various modifications, adaptations, and combinations of various features of the described embodiments can be practiced without departing from the scope of the invention as set forth in the claims.

What is claimed is:

1. A system comprising:
a content tracking system, wherein the content tracking system maintains content distribution network information and copyright profile information, wherein the content distribution network information comprises a plurality of blacklist sites and a plurality of whitelist sites; and
a content tracking network module, wherein the content tracking network module is configured to communicate with the content tracking system over a network, wherein the content tracking network module receives the content distribution network information from the content tracking system, wherein the content tracking network module is configured to monitor network traffic that flows through the content tracking network module, wherein the content tracking network module detects whether destination addresses of packets match one of the blacklist sites received from the content tracking system, wherein a packet received onto the content tracking network module has a source address and a destination address, and wherein if the content tracking network module detects that the destination address of the packet matches one of the blacklist sites, then the content tracking network module begins storing packet information of all packets flowing to the content tracking network module after the packet that have source addresses that match the source address of the packet.

2. The system of claim 1, wherein the content tracking network module resolves the destination addresses of sites in the content distribution network information through Domain Name System (DNS) Message snooping or by forward or reverse DNS lookups.

3. The system of claim 1, wherein the content distribution network information includes a plurality of ignore list sites, wherein the ignore list sites correspond to sites that are to be disregarded and not monitored by the system, wherein after the content tracking network module detects that the destination address of the packet matches one of the blacklist sites, the content tracking network module stores packet information of incoming packets that have source addresses that match the source address of the packet except for the packets with destination addresses that match one of the ignore list sites.

4. The system of claim 1, wherein the content tracking network module comprises a memory and a content tracking network flow processing module, wherein the memory of the content tracking network module includes a user browser cache, wherein the packet information is stored in the user browser cache of the memory, and wherein the packet information is indicative of activity characteristics of a user.

5. The system of claim 4, wherein the content tracking network module communicates the packet information stored in the user browser cache of the memory to the content tracking system in accordance with a time interval, and wherein the content tracking network module flushes the user browser cache after forwarding to the content tracking system.

6. The system of claim 4, wherein the content tracking system uses the packet information to identify at least one new content distribution network that corresponds to a new blacklist site, wherein the content tracking system updates the content distribution network information to include the new blacklist site, and wherein the content tracking system communicates the content distribution network information having the new blacklist site to the content tracking network module.

7. The system of claim 6, in response to the content tracking network module receiving the content distribution network information having the new blacklist site, the content tracking network module stores the new blacklist site, and content tracking network module uses the content distribution network information having the new blacklist site to monitor network traffic flowing to the content tracking network module.

8. The system of claim 4, wherein the content tracking system uses the packet information to correlate user activity with piracy such that the content tracking system determines that the user has obtained pirated content from one of the blacklist sites stored in the memory.

9. The system of claim 4, wherein the content tracking system forwards piracy information detected by the content tracking network module to a content providing entity that is registered with the content tracking system.

10. The system of claim 4, wherein the content tracking system uses the packet information to correlate user activity with piracy such that the content tracking system determines that the user has obtained authorized content from one of the whitelist sites and has uploaded the authorized content onto one of the blacklist sites within a period of time.

11. The system of claim 10, wherein the period of time is less than one minute, and wherein the content tracking system uses the copyright profile information to forward piracy information detected by the content tracking network module to a content providing entity that is registered with the content tracking system.

12. The system of claim 1, wherein the content tracking network module is part of a Dynamic Host Control Protocol (DHCP) server.

13. The system of claim 1, wherein the content tracking system provides a behavior profile of a user to an external entity, and wherein the external entity uses the behavior profile to target advertising to the user.

14. A method comprising:
(a) registering an amount of content with a maintaining a content tracking system, wherein the content tracking system maintains content distribution network information and copyright profile information, and wherein the content distribution network information comprises a plurality of blacklist sites and a plurality of whitelist sites;
(b) forwarding the content distribution network information and copyright profile information to a content tracking network module, wherein the content tracking network module is configured to communicate with the content tracking system over a network;
(c) monitoring network traffic using the content tracking network module, wherein the content tracking network module detects whether destination addresses of packets match one of the blacklist sites received from the content tracking system, and wherein a packet received into the content tracking network module has a source address and a destination address; and
(d) in response to detecting that the destination address of the packet received onto the content tracking network module matches one of the blacklist sites, then the content tracking network module begins storing packet information of all other packets received after the packet that have source addresses that match the source address of the packet.

15. The method of claim 14, further comprising:
(e) communicating the packet information stored by the content tracking network module to the content tracking system, wherein the communicating of (e) occurs repeatedly at in accordance with a time interval, and wherein the content tracking network module deletes the stored packet information after communicating the packet information to the content tracking system.

16. The method of claim 15, further comprising:
(f) using the packet information communicated in (e) to identify at least one new content distribution network that corresponds to a new blacklist site, and wherein the content tracking system updates the content distribution network information to include the new blacklist site.

17. The method of claim 16, further comprising:
(g) communicating the content distribution network information having the new blacklist site to the content tracking network module.

18. The method of claim 17, further comprising:
(h) in response to the content tracking network module receiving the content distribution network information having the new blacklist site communicated in (g), storing the new blacklist site in the content tracking network module and using the content distribution network information with the new blacklist site to monitor network traffic flowing to the content tracking network module.

19. The method of claim 15, further comprising:
(f) using the packet information communicated in (e) to correlate user activity with piracy such that the content tracking system determines that the user has obtained pirated content from one of the blacklist sites stored in the memory.

20. The method of claim 14, wherein the copyright profile information comprises at least one item taken from the group consisting of: a content distribution site that provides authorized access to an amount of digital content, a description of digital content, a plurality of keywords associated with digital content, and content creator information.

21. A system comprising:
a content tracking system, wherein the content tracking system maintains content distribution network information and copyright profile information, wherein the content distribution network information comprises a plurality of blacklist sites and a plurality of whitelist sites; and
means for monitoring traffic flow over a network, wherein the means is also for receiving the content distribution network information from the content tracking system over a network, wherein the means is also for detecting whether a destination address of a packet matches one of the blacklist sites received from the content tracking system and in response, storing packet information of all future packets that have source addresses that match a source address of the packet.

22. The system of claim 21, wherein the means is a content tracking network module having a memory and a content tracking network flow processing module.

* * * * *